(12) United States Patent
Park et al.

(10) Patent No.: US 10,154,171 B2
(45) Date of Patent: Dec. 11, 2018

(54) IMAGE FORMING APPARATUS, CLOUD SERVER, IMAGE FORMING SYSTEM, AND METHOD FOR SETTING CONNECTION WITH IMAGE FORMING APPARATUS

(71) Applicant: S-Printing Solution Co., Ltd., Suwon-si, Gyeonggi-do (KR)

(72) Inventors: In-cheon Park, Seoul (KR); Bo-yeon Kim, Suwon-si (KR); Jae-in Lee, Suwon-si (KR)

(73) Assignee: S-Printing Solution Co., Ltd., Suwon-si (KR)

(*) Notice: Subject to any disclaimer, the term of this patent is extended or adjusted under 35 U.S.C. 154(b) by 0 days.

(21) Appl. No.: 15/360,263

(22) Filed: Nov. 23, 2016

(65) Prior Publication Data
US 2017/0171426 A1 Jun. 15, 2017

(30) Foreign Application Priority Data
Dec. 14, 2015 (KR) .......................... 10-2015-0178437

(51) Int. Cl.
*H04N 1/327* (2006.01)
*H04N 1/00* (2006.01)
*H04N 1/32* (2006.01)

(52) U.S. Cl.
CPC ..... *H04N 1/32776* (2013.01); *H04N 1/00204* (2013.01); *H04N 1/00312* (2013.01); *H04N 1/00344* (2013.01); *H04N 1/32106* (2013.01); *H04N 2201/0055* (2013.01); *H04N 2201/0094* (2013.01); *H04N 2201/3207* (2013.01); *H04N 2201/3208* (2013.01); *H04N 2201/3209* (2013.01)

(58) Field of Classification Search
CPC ................................................ H04N 1/32776
USPC ....................................................... 358/1.15
See application file for complete search history.

(56) References Cited

U.S. PATENT DOCUMENTS

| | | | |
|---|---|---|---|
| 2002/0176112 A1* | 11/2002 | Miura | G06F 3/1288 358/1.18 |
| 2004/0252333 A1* | 12/2004 | Blume | H04M 1/7253 358/1.15 |
| 2014/0096202 A1* | 4/2014 | Matsuda | H04W 4/008 726/4 |
| 2014/0355047 A1* | 12/2014 | Lee | G06F 3/1292 358/1.15 |
| 2014/0355048 A1* | 12/2014 | Kang | G06F 3/1292 358/1.15 |

* cited by examiner

*Primary Examiner* — Jacky X Zheng
(74) *Attorney, Agent, or Firm* — Jefferson IP Law, LLP

(57) ABSTRACT

An image forming apparatus is provided. The image forming apparatus includes a communicator configured to receive printing data, an image former configured to print the received printing data, and at least one processor configured to, in response to receiving a request for connection setting information from the user terminal apparatus, control the communicator to transmit the connection setting information to the user terminal apparatus.

6 Claims, 20 Drawing Sheets

IMAGE FORMING APPARATUS, CLOUD SERVER, IMAGE FORMING SYSTEM, AND METHOD FOR SETTING CONNECTION WITH IMAGE FORMING APPARATUS

CROSS-REFERENCE TO RELATED APPLICATION(S)

This application claims the benefit under 35 U.S.C. § 119(a) of a Korean patent application filed on Dec. 14, 2015 in the Korean Intellectual Property Office and assigned Serial number 10-2015-0178437, the entire disclosure of which is hereby incorporated by reference.

TECHNICAL FIELD

The present disclosure relates to an image forming apparatus, a cloud server, an image forming system, and a method for setting connection with an image forming apparatus. More particularly, the present disclosure relates to an image forming apparatus which may install a program or set connection to use the image forming apparatus only through uniform resource locator (URL) connection, a cloud server, an image forming system, and a method for setting connection with an image forming apparatus.

BACKGROUND

An image forming apparatus usually refers to an apparatus which prints the printing data generated at a terminal such as a computer on a recording paper. Examples of the image forming apparatus may include a copy machine, a printer, a facsimile, or a multi-function peripheral (MFP) in which the above functions are combined and implemented on one apparatus.

In order to use an image forming apparatus, it is required to install a printer driver and set connection with the image forming apparatus. According to the related art, a user needs to install a printer driver using a compact disc (CD) for installation which is provided by a manufacturer, or need to search the related information on a web site and install a printer driver accordingly. Meanwhile, in a user terminal apparatus such as a smart phone, an application related to an image forming apparatus should be searched in a web store and installed.

In addition, after the above-mentioned program is installed, a user needs to go through the complicated process of searching an image forming apparatus that the user wishes to connect or inputting information to identify the corresponding image forming apparatus manually and setting connection with the image forming apparatus.

The above process becomes even more complicated in an environment where a program needs to be installed in a plurality of user terminal apparatuses repeatedly rather than in one user terminal apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image forming apparatus which may install a program and set connection to use the image forming apparatus only through uniform resource locator (URL) connection, a cloud server, an image forming system and a method for setting connection with an image forming apparatus.

In accordance with an aspect of the present disclosure, an image forming apparatus connectable to a user terminal apparatus is provided. The image forming apparatus includes a communicator configured to receive printing data, an image former configured to print the received printing data, and at least one processor configured to, in response to receiving a request for connection setting information from the user terminal apparatus, control the communicator to transmit the connection setting information to the user terminal apparatus.

In accordance with another aspect of the present disclosure, a cloud server is provided. The cloud server includes a communicator configured to receive apparatus information of an image forming apparatus from a user terminal apparatus and at least one processor configured to generate a URL that provides a program to control functions of the image forming apparatus and connection setting information to connect the image forming apparatus based on the received apparatus information, and provide the generated URL to the user terminal apparatus.

In accordance with another aspect of the present disclosure, an image forming system is provided. The image forming system includes an image forming apparatus, a user terminal apparatus configured to receive a connection setting information for connecting the image forming apparatus from the image forming apparatus, and a cloud server, in response to receiving connection setting information from the user terminal apparatus, is configured to generate URL corresponding to the received connection setting information, and provide the URL to the user terminal apparatus, and the user terminal apparatus, in response to receiving a URL from the cloud server, may inform another user terminal apparatus of the URL.

In accordance with another aspect of the present disclosure, a connection setting method of an image forming apparatus is provided. The connection setting method includes receiving printing data, printing the received printing data, receiving a request for connection setting information from a user terminal apparatus, and transmitting connection setting information to the user terminal apparatus.

In accordance with another aspect of the present disclosure, a connection setting method of an image forming apparatus in a cloud server is provided. The connection setting method includes receiving apparatus information of an image forming apparatus from a user terminal apparatus, generating a URL which provides a program to control functions of the image forming apparatus and connection setting information to connect the image forming apparatus based on the received apparatus information, and providing the generated URL to the user terminal apparatus.

In accordance with another aspect of the present disclosure, a computer readable recording medium is provided. The computer readable recording medium includes a program for executing a connection setting method with respect to an image forming apparatus, the method including receiving selection of an image forming apparatus, receiving connection setting information for connecting the selected image forming apparatus, providing the received connection setting information to a cloud server, receiving a URL corresponding to the image forming apparatus from the cloud server, and informing another user terminal apparatus of the URL.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms 'first', 'second', and so on may be used for describing a variety of elements, but the elements should not be limited by the terms. The terms are used only to distinguish one element from other elements.

It should be understood that terms such as "comprise" or "consist of" as used herein designate presence of characteristics, numbers, operations, elements, components or a combination thereof described herein, and do not foreclose the presence or possibility of addition of one or more other characteristics, numbers, operations, elements, components or a combination thereof.

A "module" or "unit" as used herein perform at least one function or operation and may be implemented as hardware or software, or a combination of hardware and software. Further, except the "module" or the "unit" that has to be implemented as certain hardware, a plurality of "modules" or a plurality of "units" may be integrated into at least one module and implemented as one single processor (not illustrated).

Hereinafter, the present disclosure will be described in detail with reference to the accompanying drawings.

Figure 1:
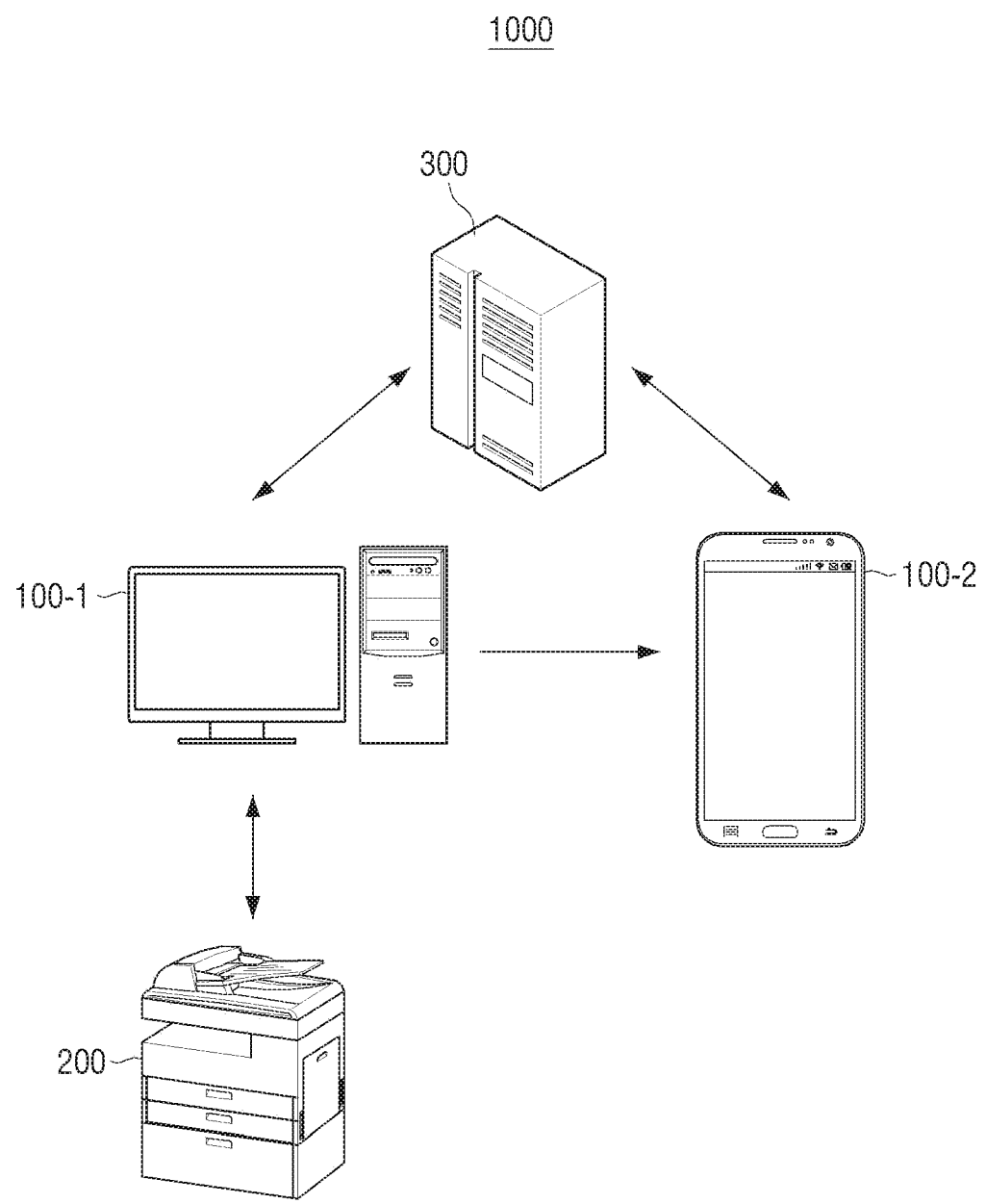
FIG. 1 is a block diagram illustrating an image forming system according to an embodiment of the present disclosure.

FIG. 1 is a block diagram illustrating an image forming system according to an embodiment of the present disclosure.

Referring to FIG. 1, a print system 1000 includes a plurality of user terminal apparatuses 100-1, 100-2, an image forming apparatus 200 and a cloud server 300.

The image forming apparatus 200 may receive printing data from one of the plurality of user terminal apparatuses 100-1, 100-2 and print the received printing data. The image forming apparatus 200 may provide connection setting information to a user terminal apparatus upon receiving a request from the user terminal apparatuses 100-1, 100-2. The image forming apparatus 200 may be a printer, a scanner, a copy machine, or a facsimile which can perform at least one function of a scan function, a print function, a fax function, and a copy function, or a multi-function peripheral combining the functions mentioned above. Specific configuration and operation of the image forming apparatus 200 will be described below by referring to FIG. 11.

Each of the user terminal apparatuses 100-1, 100-2 may store a document, convert the stored document to printing data and transmit the converted printing data to the image forming apparatus 200. To do so, the user terminal apparatuses 100-1, 100-2 should have a program which is installed to control the functions of the image forming apparatus and be connected to the image forming apparatus.

In this embodiment, a uniform resource locator (URL) will be used to easily perform installation of the program to control the functions of the image forming apparatus and connection setting described above. For easy understanding, hereinafter, it will be assumed that the first user terminal apparatus 100-1 is an apparatus which distributes a URL and the second user terminal apparatus 100-2 is an apparatus which performs programs and connection setting based on the distributed URL.

The program to control the functions of the image forming apparatus may be a printer driver, a scan driver, etc. installed in an operating system which operates in a general personal computer (PC), and so on or a printer application, etc. installed in an operating system which operates in a smart phone, and so on. The user terminal apparatuses 100-1, 100-2 may be PC, notebook PC, mobile phone, smart phone, portable media player (PMP), Moving Picture Experts Group phase 1 or phase 2 (MPEG-1 or MPEG-2) audio layer-3 (MP3) player, and the like. Specific configuration and operation of the user terminal apparatus 100 will be described below by referring to FIGS. 8 to 10.

Accordingly, the first user terminal apparatus 100-1 may distribute a URL. Specifically, if a URL is pre-stored, the first user terminal apparatus 100-1 may distribute the pre-stored URL to another terminal apparatus 100-2.

If the URL regarding the selected image forming apparatus 200 is not stored, the first user terminal apparatus 100-1 may receive selection of an image forming apparatus to be connected. This selection process may be performed in the process of installing a printer program (or a printer application) in the first user terminal apparatus 100-1. In other words, if the first user terminal apparatus 100-1 is not connected to the image forming apparatus 200, the first user terminal apparatus 100-1 may request and receive connection setting information from the image forming apparatus 200. The first user terminal apparatus 100-1 may transmit the received connection setting information to the cloud server 300. In this case, the first user terminal apparatus 100-1 may set connection with the image forming apparatus 200 using the received connection setting information.

The connection setting information may consist of information (for example, model name, serial number, etc.) which can specify the image forming apparatus 200 and information (for example, internet protocol (IP) address, media access control (MAC) address, Wi-Fi protected setup-personal identification number (WPS-PIN) information, telephone number, etc.) which can specify the location of the image forming apparatus.

The cloud server 300 which receives the connection setting information may generate URL to provide a program corresponding to the received connection setting information and the received connection setting information, and transmit the generated URL to the first user terminal apparatus 100-1. Specific configuration and operation of the cloud server 300 will be described below by referring to FIG. 12.

The URL refers to an address where the type and location of specific information is recorded, and may consist of protocol, computer address of information resources, file directory and name of the resources. For example, it may be an URL address such as http://www.printersetup.com/setup.'

In this case, the URL may include connection setting information in its file directory and resource name. For example, the URL may be 'http://www.printersetup.com/setupMFP=M4080&SN=Z6YNB5E&MacAddr=00-00-00-E0 . . . ' In addition, it also may include index information which displays the information location of the image forming apparatus. For example, the URL may be 'http://www.printersetup.com/setup/index123', or an abbreviated URL form which implies and displays the above-described URL.

When receiving a connection request with respect to a URL, the cloud server 300 may transmit a program corresponding to the URL and connection setting information to the second user terminal apparatus 100-2 which has transmitted the connection request. In this case, the cloud server 300 may identify the apparatus type of the second user terminal apparatus 100-2 which has transmitted the connection request and if the second user terminal apparatus 100-2 is a device like a PC, transmit a program which can be installed in an operating system for PC such as a printer driver or a scan driver. If the second user terminal apparatus 100-2 is a device like a smart phone, the cloud server 300 may transmit a program which can be installed in an operating system for a smart phone such as a printer application or redirect to a web store server which provides the corresponding printer application.

The redirecting refers to connecting a user terminal apparatus which has transmitted a connection request to a web page corresponding to a URL or to another address or direction instead of transmitting the information. According to an embodiment, the cloud server 300 may redirect information regarding a printer application along with connection setting information to a cloud server.

The first user terminal apparatus 100-1 which receives a URL may inform another user terminal apparatus, that is, the second user terminal apparatus 100-2, of the URL. Specifically, the first user terminal apparatus 100-1 may inform the second user terminal apparatus 100-2 of the URL in various methods, such as using short message service (SMS), multimedia messaging service (MMS), social network service (SNS) message, e-mail, messenger, etc. In addition to the above-described methods, a URL can be distributed by posting the above-described URL on an internal bulletin or a web page or through a link operation.

The second user terminal apparatus 100-2 which has been informed of the URL may access the URL and receive a program and connection setting information corresponding to the image forming apparatus 200. The second user terminal apparatus 100-2 may install the received program and completes connection setting with the image forming apparatus 200 by reflecting the received connection setting information on the installed program.

The second user terminal apparatus 100-2 where the connection setting is completed may convert a pre-stored document into printing data and transmit the data to the image forming apparatus 200.

A print system 1000 according to the above embodiment provides a program to control the functions of an image forming apparatus and connection setting information which is necessary to connect to a specific image forming apparatus through a URL, a user may complete the installing of a program and connection setting only by accessing the URL. In particular, in a corporate environment where a plurality of user terminal apparatuses uses an image forming apparatus or a plurality of image forming apparatuses are managed, a manager may complete installing of a program and connection setting only by distributing a URL and thus, work performance can be enhanced.

Meanwhile, in the above description regarding FIG. 1, only two user terminal apparatuses are connected to the cloud server 300, but more than three user terminal apparatuses 100 can be connected to the cloud server 300. In addition, in the above embodiment, the image forming apparatus 200 is connected to the first user terminal apparatus 100-1 only, but when a program, etc. is installed, the second user terminal apparatus 100-2 may also be connected to the image forming apparatus and the image forming apparatus 200 may be connected directly to the cloud server 300.

In an embodiment, each apparatus may be connected directly, but the apparatuses may also be connected indirectly through a router, another device (for example, a server), tec. In addition, in the above embodiment, each apparatus is connected via cable, but the apparatuses may also be connected wirelessly.

Meanwhile, in the above description regarding FIG. 1, the printing file is transmitted directly from the user terminal apparatus and the image forming apparatus 200 to perform printing, but in an embodiment, the user terminal apparatus may transmit the printing data to the cloud server 300 and the cloud server 300 may transmit the received printing data to the image forming apparatus 200 to perform printing.

In addition, in the above description regarding FIG. 1, the user terminal apparatus converts a document into printing data using a program and transmit the printing data to the image forming apparatus, however the document file itself may be transmitted if it is possible for the image forming apparatus 200 to receive the document itself and perform direct printing.

Further, in the above description regarding FIG. 1, the cloud server 300 and the image forming apparatus 200 are illustrated as separate apparatuses, but in an embodiment, the cloud server 300 may be implemented as a web server provided in the image forming apparatus 200. In addition, the cloud server 300 may consist of a plurality of servers such as a first server which provides a web page and a second server which provides a program.

Figure 2:
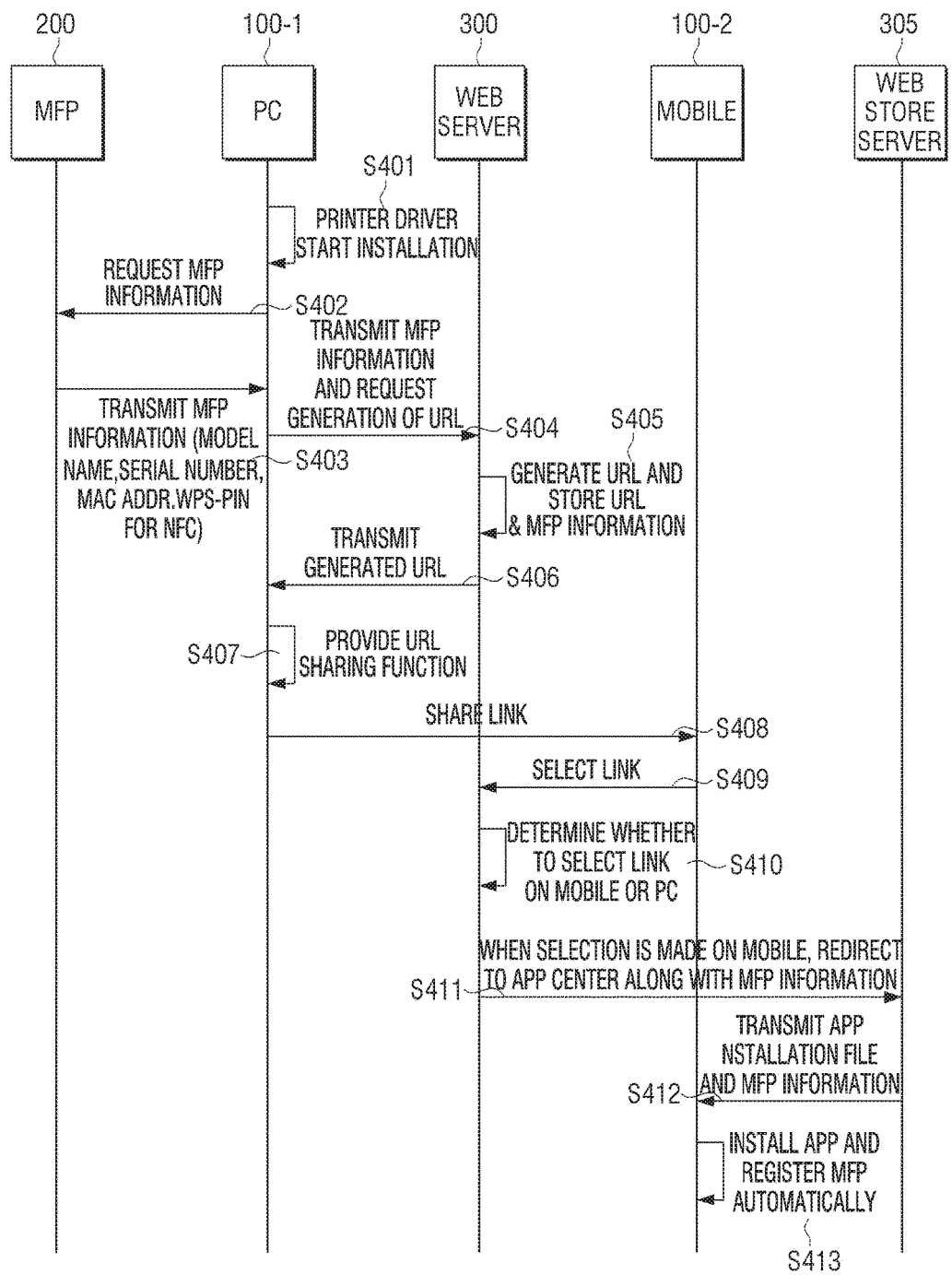
FIG. 2 is a view provided to explain a connection setting operation with an image forming apparatus according to an embodiment of the present disclosure.

FIG. 2 is a view provided to explain a connection setting operation with an image forming apparatus according to an embodiment of the present disclosure. The connection setting operation according to the embodiment is an example where an initial manager proceeds with connection setting with an image forming apparatus and distributes a URL including a program and connection setting information to another user terminal apparatus such as a mobile.

Referring to FIG. 2, the first user terminal apparatus 100-1 installs a printer driver at operation S401. Specifically, a user may search a printer driver corresponding to the image forming apparatus 200 on a web site and install the printer driver, or may install a printer driver using a compact disc (CD), etc. which is provided by the manufacturer of the image forming apparatus 200.

Once a printer driver is installed, the first user terminal apparatus 100-1 requests apparatus information (or connection setting information) to the image forming apparatus 200 at operation S402 and receives the apparatus information for connection setting with the image forming apparatus 200 at operation S403. The apparatus information includes not only the information which may specify the type of the image forming apparatus 200 but also the address information which is necessary for connection setting with the image forming apparatus 200.

The first user terminal 100-1 which has received the connection setting information sets connection with the image forming apparatus 200 based on the received connection setting information. The first user terminal apparatus 100-1 may transmit the received connection setting information to the cloud server 300 and request to generate a URL regarding the corresponding image forming apparatus 200 at operation S404.

The cloud server 300 which is requested to generate a URL may generate a URL including a corresponding program and address information which is necessary for connection setting based on the apparatus information included in the received connection setting information at operation S405. In this case, the generated URL may include the above-described program or another URL which may provide the above-described program. The generated URL includes address information in the received connection setting information.

The cloud server 300 may transmit the generated URL to the first user terminal apparatus 100-1 at operation S406. The first user terminal apparatus 100-1 may provide URL sharing function at operation (S407).

The first user terminal apparatus 100-1 may inform the second user terminal apparatus 100-2 of the received URL in various methods at operation S408. For example, the first user terminal apparatus 100-1 may inform the URL in a 1:1 or 1:N communication method such as SMS, MMS, SNS message, e-mail transmission, messenger message, etc., or post the URL on internal bulletin, web page, blog, etc.

The second user terminal apparatus 100-2 which has been informed of the URL may access the URL at operation S409. For example, if the URL is linked to an SNS message and transmitted, a user of the second user terminal apparatus 100-2 may select the link to access the URL.

The cloud server 300 identifies the type of the second user terminal apparatus 100-2 which has accessed the URL at operation S410. If the second user terminal apparatus 100-2 is a user terminal apparatus such as a smart phone, connection setting information may be redirected to a web store server 305 corresponding to the operating system of the smart phone at operation S411.

The web store server 305 which has received the connection setting information may transmit an installation program and connection setting information regarding the corresponding application to the second user terminal apparatus 100-2 at operation S412. In this case, authentication and charging operation regarding the second user terminal apparatus 100-2 may be performed.

The second user terminal apparatus 100-2 which has been provided with the installation program may install the installation program automatically and set connection with the image forming apparatus 200 based on the provided connection setting information at operation S413.

In the above embodiment, the cloud server 300 is provided with the installation program by the separate web store server 305, but the installation program may be provided by the cloud server 300. Such an example will be described below with reference to FIG. 3.

Figure 3:
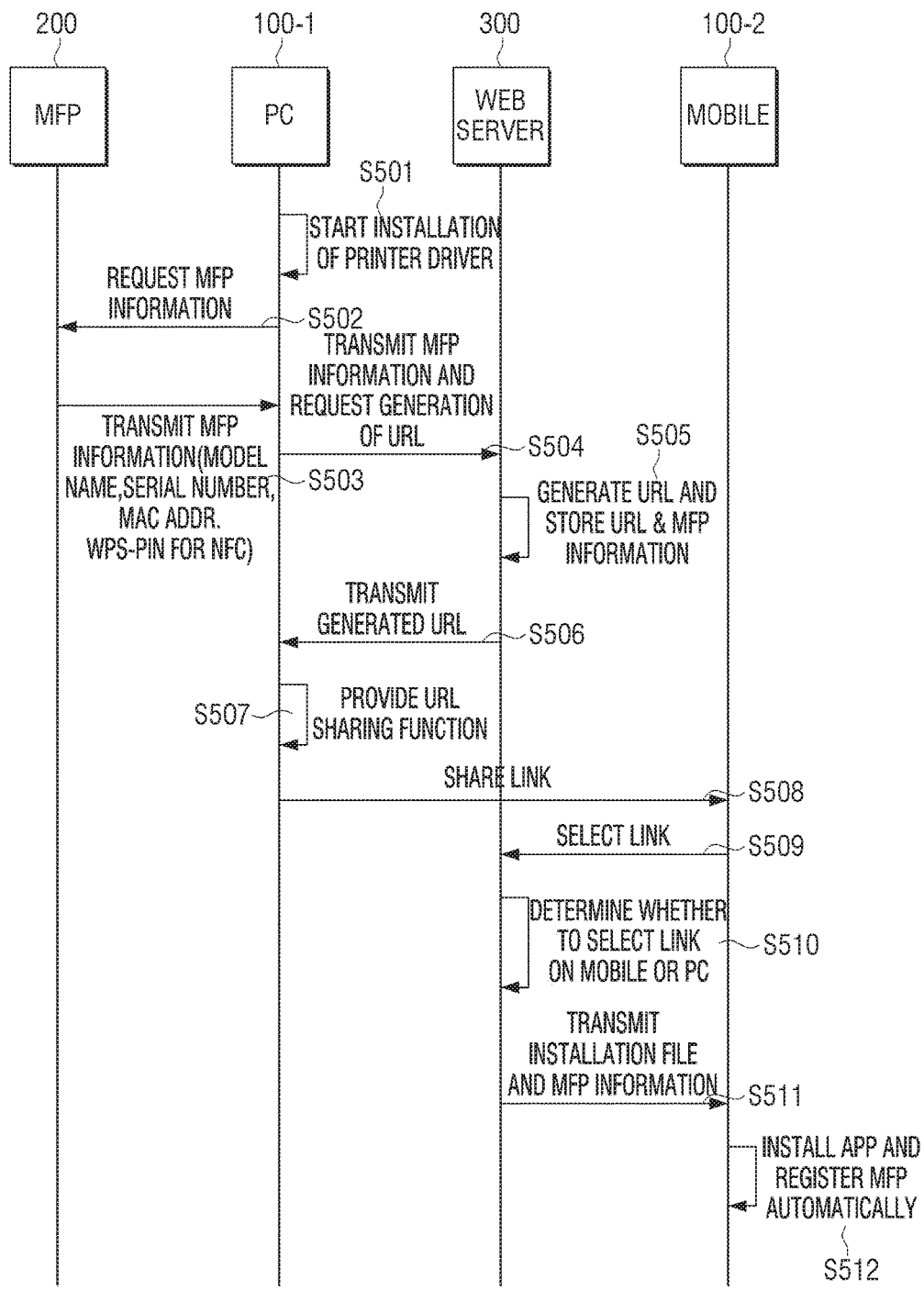
FIG. 3 is a view provided to explain a connection setting operation with an image forming apparatus according to an embodiment of the present disclosure.

FIG. 3 is a view provided to explain a connection setting operation with an image forming apparatus according to an embodiment of the present disclosure. The connection setting operation of the current embodiment is the same as that of another embodiment, but in the second embodiment, the cloud server 300 also provides a URL and a program to control the functions of an image forming apparatus.

Referring to FIG. 3, the first user terminal apparatus 100-1 installs a printer driver at operation S501. Specifically, a user may search a printer driver corresponding to the image forming apparatus 200 on a web site and install the printer driver, or may install a printer driver using a CD, etc. which is provided by the manufacturer of the image forming apparatus 200.

Once a printer driver is installed, the first user terminal apparatus 100-1 requests apparatus information (or connection setting information) to the image forming apparatus 200 and receives the information for connection setting with the image forming apparatus 200 at operations S502 and S503. The apparatus information includes not only the information which may specify the type of the image forming apparatus 200 but also the address information which is necessary for connection setting with the image forming apparatus 200.

The first user terminal 100-1 which has received the connection setting information sets connection with the image forming apparatus 200 based on the received connection setting information. The first user terminal apparatus 100-1 may transmit the received connection setting information to the cloud server 300 and request to generate a URL regarding the corresponding image forming apparatus 200 at operation S504.

The cloud server 300 which is requested to generate a URL may generate a URL including a corresponding program and address information which is necessary for connection setting based on the apparatus information included in the received connection setting information at operation S505. In this case, the generated URL includes the above-described program and address information in the received connection setting information. In the above embodiment, the URL itself includes a program, but the URL may include the location of a storage which stores the program in the cloud server 300.

The cloud server 300 may transmit the generated URL to the first user terminal apparatus 100-1 at operation S506, and the first user terminal apparatus 100-1 may provide URL sharing function at operation S507.

The first user terminal apparatus 100-1 may inform the second user terminal apparatus 100-2 of the received URL in various methods at operation S508. For example, the first user terminal apparatus 100-1 may inform the URL in a 1:1 or 1:N communication method such as SMS, MMS, SNS message, e-mail transmission, messenger message, etc., or post the URL on internal bulletin, web page, blog, etc.

The second user terminal apparatus 100-2 which has been informed of the URL may access the URL at operation S509. For example, if the URL is linked to an SNS message and transmitted, a user of the second user terminal apparatus 100-2 may select the link to access the URL.

The cloud server 300 identifies the type of the second user terminal apparatus 100-2 which has accessed the URL at operation S510.

The cloud server 300 may transmit an installation program and connection setting information corresponding to the type and URL of the user terminal apparatus to the second user terminal apparatus 100-2 at operation S511. In this case, authentication and charging operation regarding the second user terminal apparatus 100-2 may be performed.

The second user terminal apparatus 100-2 which has been provided with the installation program may install the installation program automatically and set connection with the image forming apparatus 200 based on the provided connection setting information at operation S512.

Figure 4:
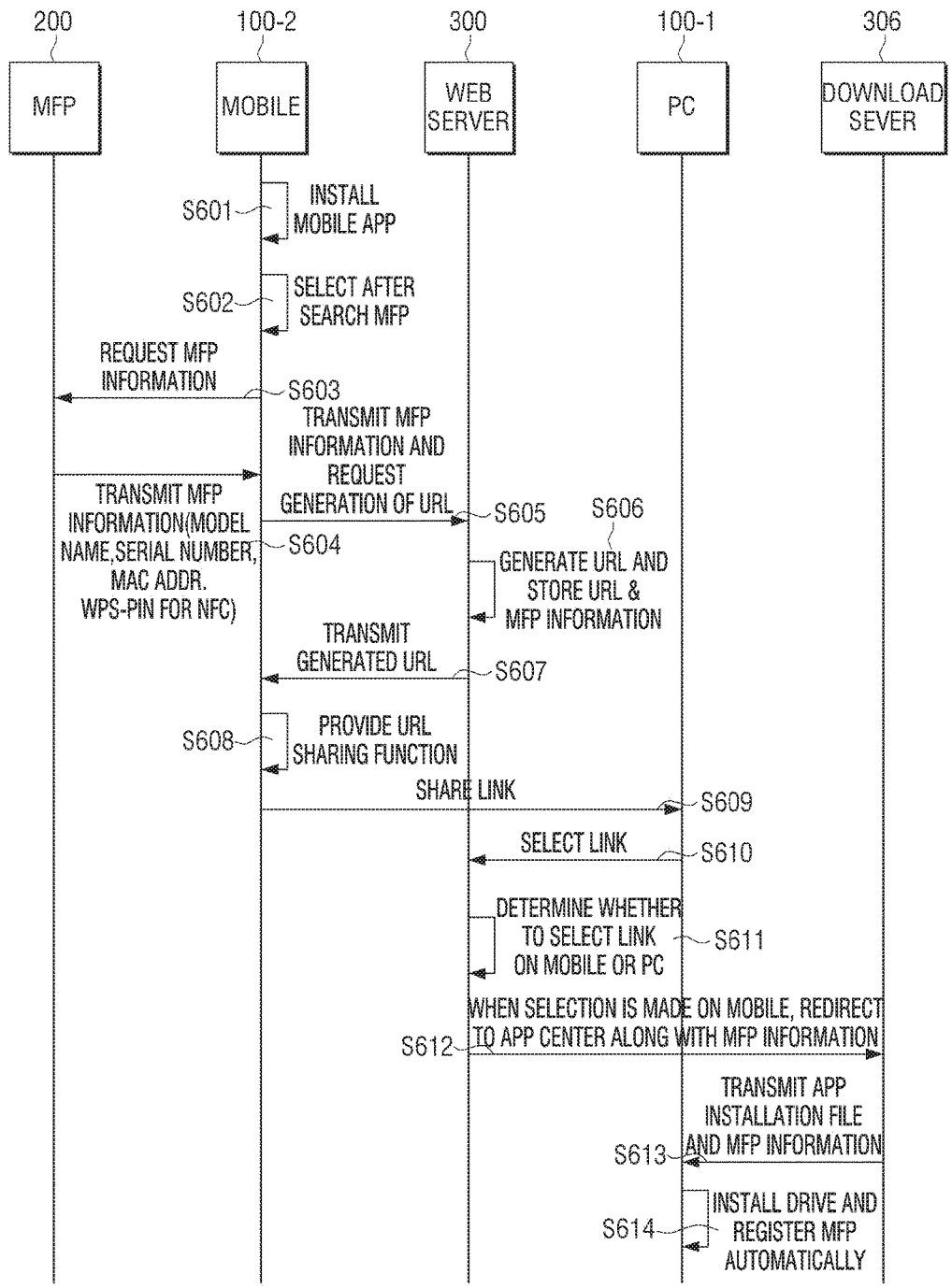
FIG. 4 is a view provided to explain a connection setting operation with an image forming apparatus according to an embodiment of the present disclosure.

FIG. 4 is a view provided to explain a connection setting operation with an image forming apparatus according to an embodiment of the present disclosure. The connection setting operation according to the current embodiment is an example where a user installs an application on a mobile device and then, intends to install a printer driver in his or her own PC.

Referring to FIG. 4, the second user terminal apparatus 100-2 may receive an installation file of an application corresponding to the image forming apparatus 200 from a web store and install the installation file at operation S601. When the application is operated after the corresponding file is installed, the corresponding application receives a user selection to specify an image forming apparatus at operation S602. Specifically, the second user terminal apparatus 100-2 may display a list of image forming apparatuses by searching apparatuses connected to a network and receive a user selection regarding an image forming apparatus to be connected.

As for the selected image forming apparatus 200, the second user terminal apparatus 100-2 requests apparatus information (or connection setting information) to the image forming apparatus 200 and receives the information from the image forming apparatus 200 at operations S603 and S604. The apparatus information includes not only the information which may specify the type of the image forming apparatus 200 but also the address information which is necessary for connection setting with the image forming apparatus 200.

The second user terminal apparatus 100-2 which has received the connection setting information sets connection with the image forming apparatus 200 based on the received connection setting information. The second user terminal apparatus 100-2 may transmit the received connection setting information to the cloud server 300 and request to generate a URL regarding the corresponding image forming apparatus 200 at operation S605.

The cloud server 300 which has been requested to generate a URL may generate a URL including a corresponding program and address information which is necessary for connection setting based on the apparatus information included in the received connection setting information at operation S606. In this case, the generated URL may include the above-described program or another URL which may provide the above-described program. The generated URL includes address information in the received connection setting information.

The cloud server 300 may transmit the generated URL to the second user terminal apparatus 100-2 at operation S607, and the second user terminal apparatus 100-2 may provide URL sharing function.

The second user terminal apparatus 100-2 may inform the first user terminal apparatus 100-1 of the received URL in various methods at operation S609. For example, the second user terminal apparatus 100-2 may inform the URL in a 1:1 or 1:N communication method such as SMS, MMS, SNS message, e-mail transmission, messenger message, etc., or post the URL on internal bulletin, web page, blog, etc.

The first user terminal apparatus 100-1 which has been informed of the URL may access the URL at operation S610. For example, if the URL is linked to an SNS message and transmitted, a user of the second user terminal apparatus 100-2 may select the link to access the URL.

The cloud server 300 identifies the type of the first user terminal apparatus 100-1 which has accessed the URL at operation S611. If the first user terminal apparatus 100-1 is a user terminal apparatus such as PC or notebook PC, the connection setting information may be redirected to a download server 306 corresponding to the operating system of the corresponding user terminal apparatus at operation S612.

The download server 306 which has received the connection setting information may transmit may transmit an installation program and connection setting information corresponding to the image forming apparatus 200 to the first user terminal apparatus 100-1 at operation S613. In this case, authentication and a charging operation regarding the second user terminal apparatus 100-2 may be performed.

The first user terminal apparatus 100-1 which has been provided with the installation program may install the installation program automatically and set connection with the image forming apparatus 200 based on the provided connection setting information at operation S614.

In the above embodiment, the cloud server 300 is provided with the installation program by the separate web store server 305, but the installation program may be provided by the cloud server 300. Such an example will be described below with reference to FIG. 5.

Figure 5:
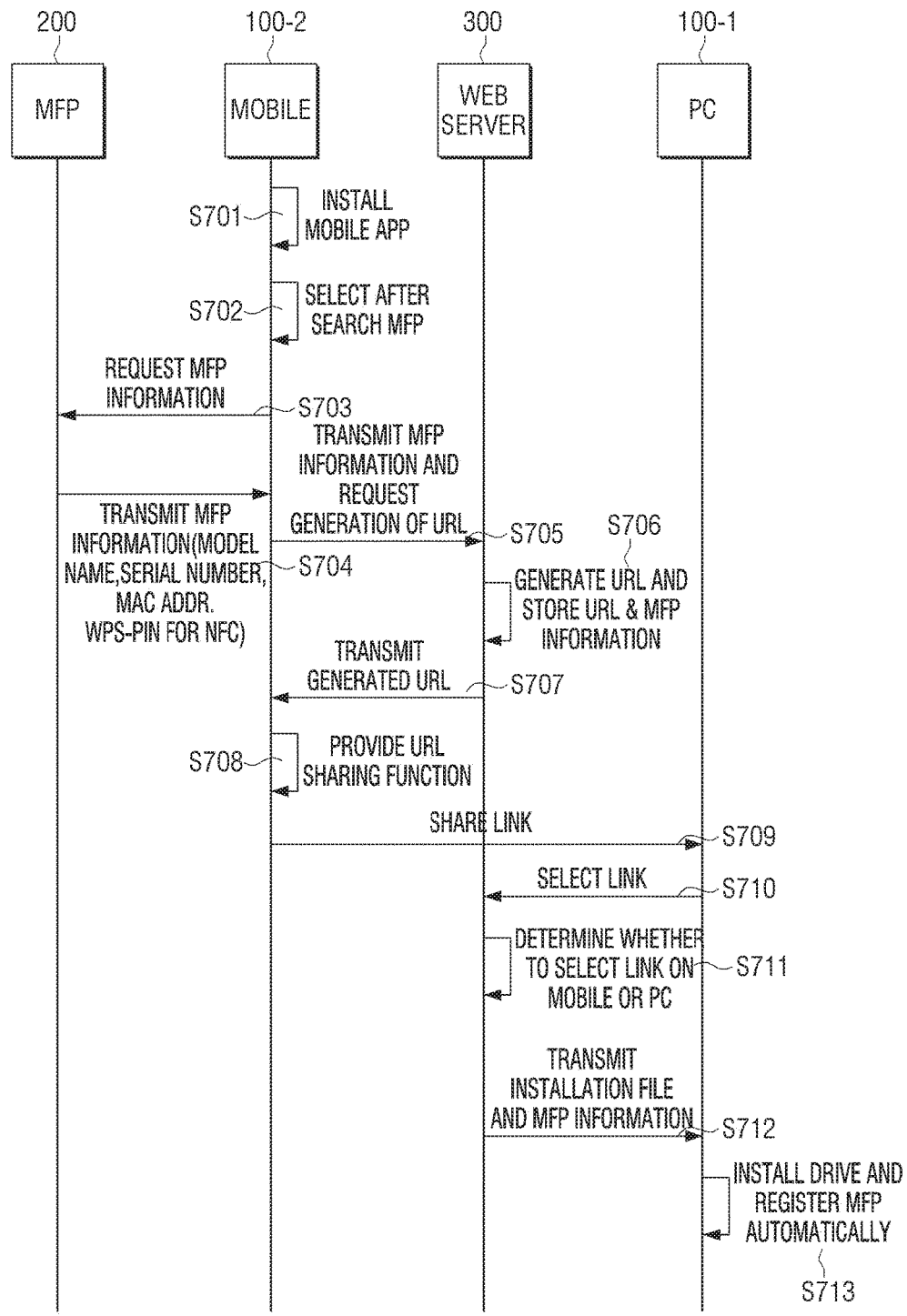
FIG. 5 is a view provided to explain a connection setting operation with an image forming apparatus according to an embodiment of the present disclosure.

FIG. 5 is a view provided to explain a connection setting operation with an image forming apparatus according to an embodiment of the present disclosure. The connection setting operation of the current embodiment is the same as that of the another embodiment, but in the current embodiment, the cloud server 300 provides a URL and also distributes a program to control the functions of an image forming apparatus.

Referring to FIG. 5, the second user terminal apparatus 100-2 may receive an installation file of an application corresponding to the image forming apparatus 200 from a web store and install the installation file at operation S701. When the application is operated after the corresponding file is installed, the corresponding application receives a user selection to specify an image forming apparatus at operation S702. Specifically, the second user terminal apparatus 100-2 may display a list of image forming apparatuses by searching apparatuses connected to a network and receive a user selection regarding an image forming apparatus to be connected.

As for the selected image forming apparatus 200, the second user terminal apparatus 100-2 requests apparatus information (or connection setting information) to the image forming apparatus 200 and receives the information from the image forming apparatus 200 at operations S703 and S704. The apparatus information includes not only the information which may specify the type of the image forming apparatus 200 but also the address information which is necessary for connection setting with the image forming apparatus 200.

The second user terminal apparatus 100-2 which has received the connection setting information sets connection with the image forming apparatus 200 based on the received connection setting information. The second user terminal apparatus 100-2 may transmit the received connection setting information to the cloud server 300 and request to generate a URL regarding the corresponding image forming apparatus 200 at operation S705.

The cloud server 300 which has been requested to generate a URL may generate a URL including a corresponding program and address information which is necessary for connection setting based on the apparatus information included in the received connection setting information at operation S706. In this case, the generated URL may include the above-described program or another URL which may provide the above-described program. The generated URL includes address information in the received connection setting information.

The cloud server 300 may transmit the generated URL to the second user terminal apparatus 100-2 at operation S707.

The second user terminal apparatus 100-2 may inform the first user terminal apparatus 100-1 of the received URL in various methods at operations S708 and S709. For example, the second user terminal apparatus 100-2 may inform the URL in a 1:1 or 1:N communication method such as SMS, MMS, SNS message, e-mail transmission, messenger message, etc., or post the URL on internal bulletin, web page, blog, etc.

The first user terminal apparatus 100-1 which has been informed of the URL may access the URL at operation S710. For example, if the URL is linked to an SNS message and transmitted, a user of the second user terminal apparatus 100-2 may select the link to access the URL.

The cloud server 300 identifies the type of the first user terminal apparatus 100-1 which has accessed the URL at operation S711. If the first user terminal apparatus 100-1 is a user terminal apparatus such as PC or notebook PC, an installation program and connecting setting information corresponding to the operating system of the corresponding user terminal apparatus may be transmitted to the first user terminal apparatus 100-1 at operation S712.

The first user terminal apparatus 100-1 which has been provided with the installation program may install the installation program automatically and set connection with the image forming apparatus 200 based on the provided connection setting information at operation S713.

In the above description regarding FIGS. 2 to 5, it is illustrated and explained that the cloud server 300 which is a web server generates a URL, but in an embodiment, a user terminal apparatus may generate a URL. For example, in the case of FIGS. 2 and 3, the first user terminal apparatus 100-1 may generate a URL.

In the above description, the cloud server 300 generates a URL, but a web server may be provided in the image forming apparatus 200. Such an example will now be described with reference to FIG. 6.

Figure 6:
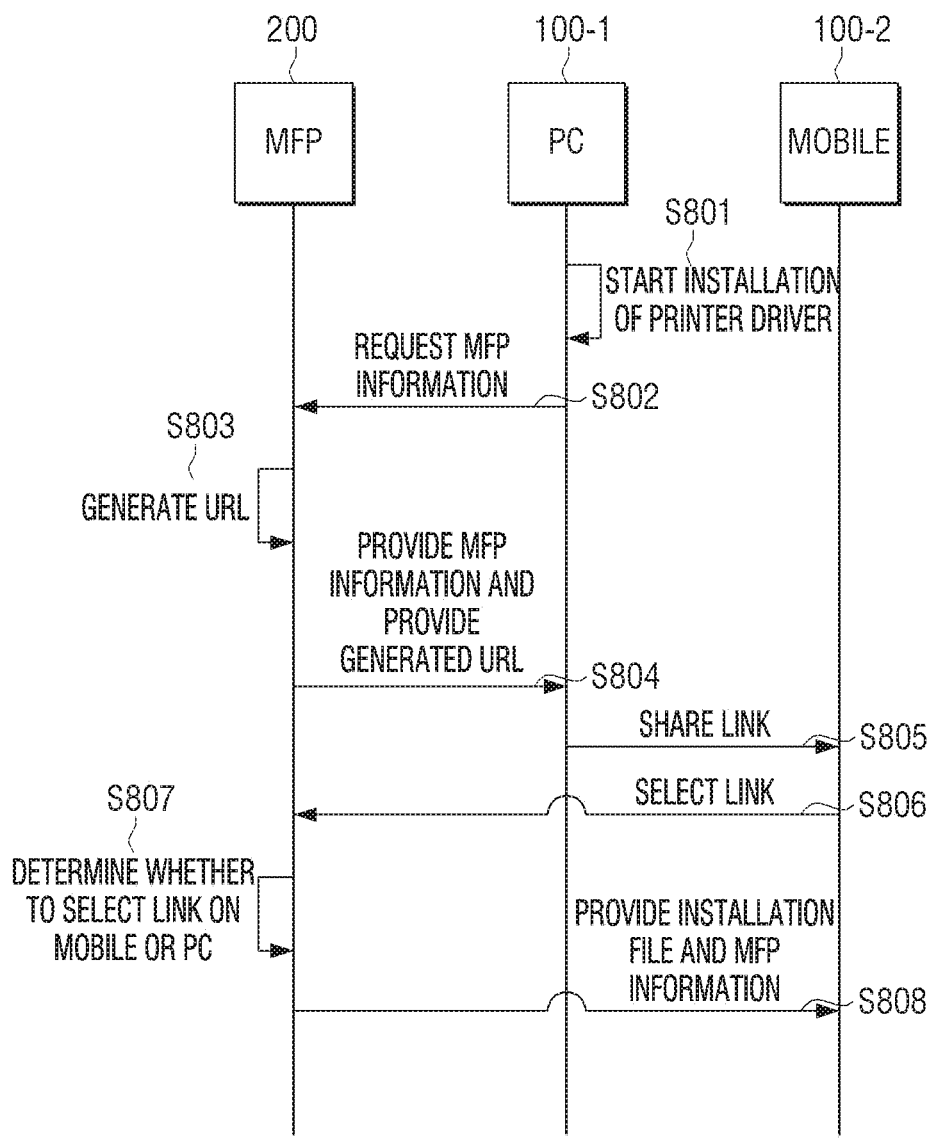
FIG. 6 is a view provided to explain a connection setting operation with an image forming apparatus according to an embodiment of the present disclosure.

FIG. 6 is a view provided to explain a connection setting operation with an image forming apparatus according to an embodiment of the present disclosure. The connection setting operation of the current embodiment is an embodiment where an initial manger proceeds with connection setting with an image forming apparatus and the image forming apparatus 200 is equipped with a web server and has a URL therein.

Referring to FIG. 6, the first user terminal apparatus 100-1 installs a printer driver at operation S801. Specifically, a user may search a printer driver corresponding to the image forming apparatus 200 on a web site and install the printer driver, or may install a printer driver using a CD, etc. which is provided by the manufacturer of the image forming apparatus 200.

Once a printer driver is installed, the first user terminal apparatus 100-1 requests apparatus information (or connection setting information) to the image forming apparatus 200 for connection setting with the image forming apparatus 200 at operation S802.

The image forming apparatus 200 which has received such a request may generate a URL having a corresponding program and address information which is necessary for connection setting based on its own apparatus information at operation S803. The generated URL may include the above-identified program or information on another URL which may provide the above-identified program. The generated URL includes address information in the received connection setting information.

The image forming apparatus 200 may transmit the generated URL and the connection setting information to the first user terminal apparatus 100-1 at operation S804. Meanwhile, in the above embodiment, the connection setting information is transmitted to the first user terminal apparatus 100-1 separately, but the first user terminal apparatus 100-1 may receive the connection setting information through the operation of accessing the URL corresponding to the received URL.

The first user terminal apparatus 100-1 may inform the second user terminal apparatus 100-2 of the received URL in various methods at operation S805. For example, the first user terminal apparatus 100-1 may inform the URL in a 1:1 or 1:N communication method such as SMS, MMS, SNS message, e-mail transmission, messenger message, etc., or post the URL on internal bulletin, web page, blog, etc.

The second user terminal apparatus 100-2 which has been informed of the URL may access the URL at operation S806. For example, if the URL is linked to an SNS message and transmitted, a user of the second user terminal apparatus 100-2 may select the link to access the URL.

The image forming apparatus 200 which has accessed the URL identifies the type of the second user terminal apparatus 100-2 at operation S807, and may transmit an installation program corresponding to the identified type of the user terminal apparatus and connection setting information to the second user terminal apparatus 100-2 at operation S808.

The second user terminal apparatus which has been provided with the installation program may install the installation program automatically and set connection with the image forming apparatus 200 based on the provided connection setting information.

Figure 7:
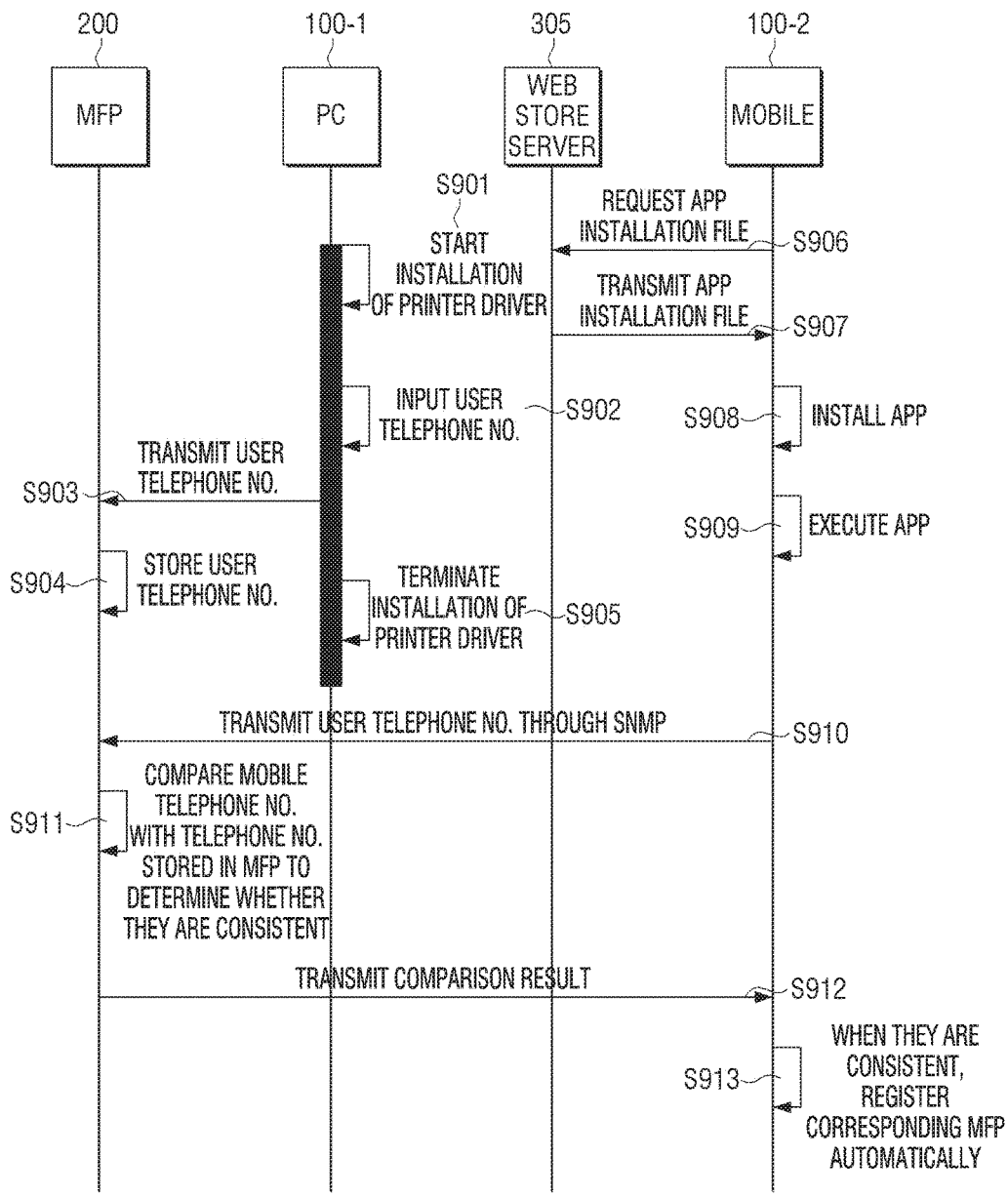
FIG. 7 is a view provided to explain a connection setting operation with an image forming apparatus according to an embodiment of the present disclosure.

FIG. 7 is a view provided to explain a connection setting operation with an image forming apparatus according to an embodiment of the present disclosure. Specifically, the sixth embodiment is an embodiment where the first user terminal apparatus inputs intrinsic information of the second user terminal apparatus so that the second user terminal apparatus may perform connection setting with an image forming apparatus simply by installing a program.

Referring to FIG. 7, the first user terminal apparatus 100-1 installs a printer driver at operation S901. Specifically, a user may search a printer driver corresponding to the image forming apparatus 200 on a web site and install the printer driver, or may install a printer driver using a CD, etc. which is provided by the manufacturer of the image forming apparatus 200.

Once a printer driver is installed, the printer driver receives an input of the intrinsic information (for example, telephone number, MAC, serial number, etc.) of the second user terminal apparatus for a user at operation S902. The intrinsic information which is input may be transmitted to the image forming apparatus 200 at operation S903.

If there is no connection setting information of the image forming apparatus 200 in the first user terminal apparatus 100-1, the first user terminal apparatus 100-1 may request the connection setting information to the image forming apparatus 200, receive the connection setting information from the image forming apparatus 200, complete the connection setting with the image forming apparatus 200, and complete the installation of the printer driver at operation S905.

Meanwhile, the image forming apparatus 200 stores the intrinsic information which is input at operation S904.

After connection setting of the first user terminal apparatus 100-1 such as a PC, a user may use the image forming apparatus 200 in the second user terminal apparatus 100-2 such as a smart phone as well.

In this case, the second user terminal apparatus 100-2 may receive an installation file of an application corresponding to the image forming apparatus 200 from a web store server 305 and install the installation file at operations S906, S907, and S908. When the application is operated after the corresponding file is installed at operation S909, the corresponding application may inform another apparatus in a network of the intrinsic information of the second user terminal apparatus 100-2 using a simple network management protocol (SNMP). The intrinsic information may be telephone number, MAC address, serial information, SNS identification (ID), messenger ID, etc. The SNMP refers to a protocol for network management by collecting various pieces of information automatically from each host on transmission control protocol (TCP)/IP network regularly.

The image forming apparatus 200 which has received such intrinsic information at operation S910 may compare the intrinsic information at operation S911 with pre-stored information and if there is corresponding information, inform the second user terminal apparatus 100-2 of the connection setting information of the image forming apparatus 200 at operation S912.

The second user terminal apparatus 100-2 which has received the connection setting information may set connection with the image forming apparatus 200 automatically at operation S913.

Figure 8:
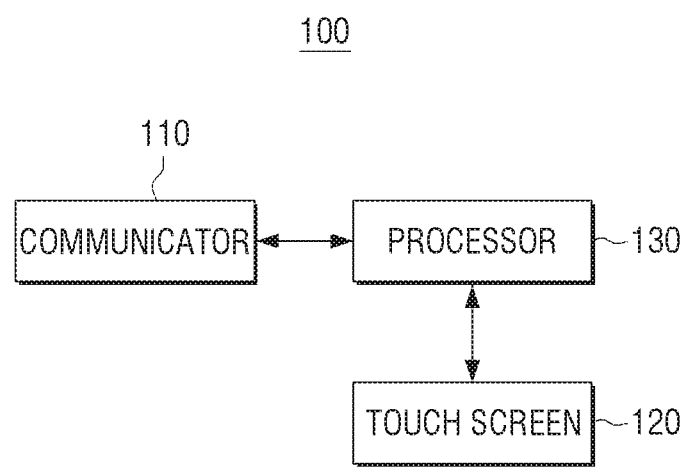
FIG. 8 is a block diagram illustrating brief configuration of a user terminal apparatus of FIG. 1 according to an embodiment of the present disclosure.

FIG. 8 is a block diagram illustrating brief configuration of a user terminal apparatus of FIG. 1 according to an embodiment of the present disclosure.

The user terminal apparatus 100 of FIG. 8 may be implemented as various types of apparatuses such as television (TV), PC, laptop PC, portable phone, tablet PC, personal digital assistant (PDA), MP3 player, kiosk, electronic frame, and so on. In an implementation of the portable-type apparatus such as portable phone, tablet PC, PDA, MP3 player, and laptop PC, the apparatus may be named as "a mobile device", but in this specification, it will be collectively referred to as "a user terminal apparatus."

Referring to FIG. 8, the user terminal apparatus 100 may be composed of a communicator 110, a touch screen 120 and a processor 130. The user terminal apparatus 100 may be functioned as the first user terminal apparatus 100-1 of FIG. 1 and may also be functioned as the second user terminal apparatus 100-2 of FIG. 1.

The communicator 110 (or transceiver) may be formed to connect to an external apparatus and the connection may be performed through universal serial bus (USB) port and wireless module as well as local area network (LAN) and internet network. The communicator 210 may be formed to connect the user terminal apparatus 100 to an external apparatus (not illustrated). The connecting may be performed according to the mobile communication methods (e.g., global system for mobile communications (GSM), universal mobile telecommunications system (UMTS), long term evolution (LTE), wireless broadband (WiBRO)) as well as LAN and internet network.

The communicator 110 may request connection setting information to the selected image forming apparatus and receive the connection setting information. The connection setting information may consist of information to specify the image forming apparatus 200 (for example, model name, serial number, etc.) and information to specify the location of the image forming apparatus (for example, IP address, MAC address, WPS-PIN information, etc.).

The communicator 110 may transmit the received connection setting information to the cloud server 300. The communicator 110 may receive a URL from the cloud server 300. The URL refers to an address where the type and location of specific information is recorded, and may consist of protocol, computer address of information resources, file directory and name of the resources. For example, it may be an URL address such as http://www.printersetup.com/setup.'

In this case, the URL may include connection setting information in its file directory and resource name. For example, the URL may be 'http://www.printersetup.com/setupMFP=M4080&SN=Z6YNB5E&MacAddr=00-00-00-E0 . . . ' In addition, it also may include index information which displays the information location of the image forming apparatus. For example, the URL may be 'http://www.printersetup.com/setup/index123', or an abbreviated URL form which implies and displays the above-described URL.

The communicator 110 may inform another user terminal apparatus of the received URL. Specifically, the communicator 110 may inform the second user terminal apparatus 100-2 of the URL in various ways such as SMS, MMS, SNS message, e-mail, messenger, etc. Alternatively, the URL may be distributed by posting the URL on internal bulletin or web page, or through a link operation.

The communicator 110 may receive a URL from another user terminal apparatus.

Further, the communicator 110 may transmit intrinsic information of the user terminal apparatus 100 to the image forming apparatus 200. The intrinsic information may be telephone number, MAC address, serial information, SNS ID, messenger ID, etc.

The communicator 110 may transmit a connection request to the URL and receive a program to control the functions of the image forming apparatus and connection setting information in response to the connection request. In this case, the communicator 110 may download the program directly from the cloud server 300 corresponding to the connection request or download the program from other servers 305, 306 redirected by the cloud server 300.

The communicator 110 may transmit printing data to the image forming apparatus 200. The printing data may be data in a printing language such as postscript (PS), printer control language (PCL), etc., and if the image forming apparatus 200 supports direct printing, may be a file itself such as portable document format (PDF), extensible markup language (XML) paper specification (XPS), bitmap (BMP), joint photographic experts group (JPG), etc.

The touch screen 120 may display icons regarding a plurality of applications previously installed on the user terminal apparatus 100. Further, the touch screen 120 may receive the selection of any one of the icons regarding a plurality of displayed applications. In this case, the selected application may be printer driver, scan driver, or printer application to control the functions of the image forming apparatus. When a program is driven in response to the user selection, the touch screen 120 may receive an input of the document to be printed, the printing option, and so on and may receive a printing command.

In the above embodiment, the touch screen 120 which is capable of performing both a display function and an input function is used, but input apparatuses such as a display apparatus, a keyboard, a mouse, etc. may be combined.

The touch screen 120 may receive an input of a series of control commands to install a program of a printer application, a printer driver, etc. For example, if a user terminal apparatus is a smart phone, a user command to connect to a web store, a command to search a specific program, a command to install a searched program, etc. may be input.

The touch screen 120 may display a list of the image forming apparatuses that can be connected, and receive the selection of any one among them. An example of a user interface window which may be displayed will be described later with reference to FIG. 13.

The touch screen 120 may receive selection of another user terminal apparatus to inform an URL or an address (or a telephone number, etc.). An example of a user interface window which may be displayed will be described later with reference to FIG. 14.

The touch screen 120 may display a URL received from another user terminal apparatus and receive selection from a user. An example of a user interface window which may be displayed will be described later with reference to FIG. 15.

In addition, the touch screen 120 may receive an input of intrinsic information of another user terminal apparatus (for example, telephone number, MAC address, serial information, SNS ID, messenger ID, etc.). An example of a user interface window which may be displayed will be described later with reference to FIG. 16.

The processor 130 controls each element of the user terminal apparatus 100. Specifically, if the processor 130 receives an input of a program install command to control the functions of an image forming apparatus, the processor 130 may install the corresponding program and control the touch screen 120 to receive selection of an image forming apparatus to be connected.

If a user selects an image forming apparatus to be connected, the processor 130 may control the communicator 110 to request connection setting information (or apparatus information) to the selected image forming apparatus and receive the connection setting information (or apparatus information) from the image forming apparatus.

Further, the processor 130 may control the communicator 110 to transmit the received connection setting information to the cloud server 300. When a URL is received from the could server 300 in response to the transmission, the processor 130 may control the touch screen 120 to display a user interface window for receiving selection of another user or another user terminal apparatus to be informed of the received URL.

When another user terminal apparatus is selected, the processor 130 may control the communicator 110 to inform the selected another user terminal apparatus of the received URL.

When the URL is received from another user terminal apparatus, the processor 130 may control the touch screen 120 to display the received URL. If a user selects the URL in this state, the processor 130 may control the communicator 110 to request transmission of information corresponding to the URL to the cloud server 300 corresponding to the URL. If a program and connection setting information are received in response to the request, the processor 130 may install the received program and set connection with the corresponding image forming apparatus using the received connection setting information after installing the program.

If a printing command regarding a document is input from a user, the processor 130 may generate printing data regarding the selected document using a pre-installed program to control the functions of an image forming apparatus, and control the communicator 110 to transmit the generated printing data to the corresponding image forming apparatus.

According to the above-described embodiment, the user terminal apparatus 100 provides a program to control the functions of the image forming apparatus and connection setting information which is necessary for connection with a specific image forming apparatus through a URL and thus, a user may install the program and complete connection setting simply by accessing the corresponding URL. In particular, in a corporate environment where a plurality of user terminal apparatuses uses an image forming apparatus or a plurality of image forming apparatuses are managed, a manager may complete installing of a program and connection setting only by distributing a URL and thus, work performance can be enhanced.

Meanwhile, although the above illustrates and explains the simple configuration of the image forming apparatus, various elements may be additionally included in actual implementation. This will be explained below by referring to FIG. 9.

Figure 9:
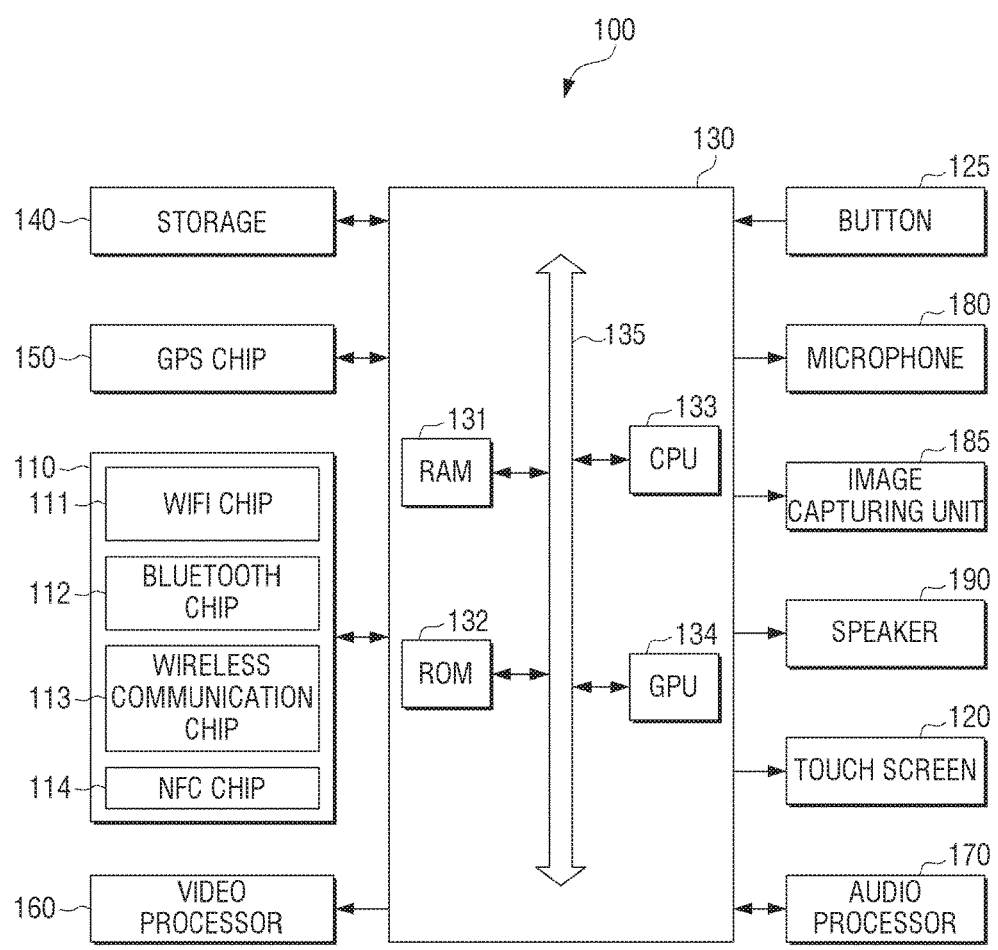
FIG. 9 is a block diagram illustrating detailed configuration of a user terminal apparatus of FIG. 1 according to an embodiment of the present disclosure.

FIG. 9 is a block diagram illustrating detailed configuration of a user terminal apparatus of FIG. 1 according to an embodiment of the present disclosure.

Referring to FIG. 9, the user terminal apparatus 100 includes the communicator 110, the touch screen 120, the processor 130, a storage 140, a global positioning system (GPS) chip 150, a video processor 160, an audio processor 170, a button 125, a microphone 180, an image capturing unit (camera) 185, and a speaker 190.

The communicator 110 is an element that communicates with various types of external apparatuses according to various types of communication methods. The communicator 110 includes a Wi-Fi chip 111, a Bluetooth chip 112, a wireless communication chip 113, and a near field communication (NFC) chip 114. The processor 130 performs communication with various external devices using the communicator 110.

The Wi-Fi chip 111 and the Bluetooth chip 112 respectively perform communication according to a Wi-Fi method and a Bluetooth method. When Wi-Fi chip 111 and Bluetooth chip 112 are used, various connecting information such as service set identifier (SSID) and session key may be first transmitted and received, the communication may be connected by using the connecting information, and various types of information may be transmitted and received. The wireless communication chip 113 refers to a chip which communicates according to various communication standards such as Institute of Electrical and Electronics Engineers (IEEE), ZigBee, 3rd generation (3G), 3G partnership project (3GPP), LTE, and the like. The NFC chip 114 indicates chip to operate in NFC method using 13.56 MHz bandwidth among various radio frequency ID (RF-ID) frequency bandwidths such as 135 kHz, 13.56 MHz, 433 MHz, 860~960 MHz, and 2.45 GHz.

As described above, the touch screen 120 may display a user interface window for receiving selection of an image forming apparatus and selecting another user terminal apparatus to inform a URL. The touch screen 120 may be implemented as various types of displays such as a liquid crystal display (LCD), an organic light emitting diodes (OLED) display, and a plasma display panel (PDP). The touch screen 120 may include driving circuits that can be implemented as, for example, amorphous silicon thin film transistor (a-si TFT), low temperature polysilicon (LTPS) TFT, and organic TFT (OTFT), backlight units, and so on. Further, the touch screen 120 may be implemented as a flexible display.

Meanwhile, the touch screen 120 may include a touch sensor to sense touch gestures of a user. The touch sensor may be implemented as various types of sensors such as a capacitive type, a resistive type, or a piezoelectric type. The capacitive type calculates touch coordinate values by sensing micro-electricity, excited by the user's body, with coated conductive materials on the surface of the touch screen when a part of the user's body touches the surface of the touch screen. According to the resistive type, the touch screen includes two electrode plates and calculates touch coordinate values by sensing electric current that flows upon contacting of the upper and the lower plates on the touched point when a user touches the screen. Furthermore, when the user terminal apparatus 100 supports a pen inputting function, the touch screen 120 may sense user gestures to use inputting means such as a pen in addition to the user finger. When the inputting means is a stylus pen including coils, the user terminal apparatus 100 may include a magnetic sensor to sense magnetic fields which change according to the proximity of the coils within the stylus pen to the magnetic sensor. Therefore, in addition to sensing touch gestures, the user terminal apparatus 100 may also sense approaching gestures, i.e., hovering.

Meanwhile, in the above embodiment, one touch screen 120 performs a display function and a gesture sensing function, but the display function and the gesture sensing function may be performed in different elements. In other words, a touch panel capable of displaying an image only and a touch panel capable of sensing a touch only can be combined to constitute the touch screen 120.

The storage 140 may store various programs and data used for the operations of the user terminal apparatus 100. Specifically, the storage 140 may store programs and data for creating various UIs constituting a user interface window.

In addition, the storage 140 may store various contents. The contents may be a document file, an image file, etc. which can be printed. The storage 140 may store a plurality of telephone numbers.

The storage 140 may store a plurality of applications. At least one application may be printer driver, scan driver, or printer application for the operations according to an embodiment.

The processor 130 displays a user interface window on the touch screen 120 using programs and data stored in the storage 140. Further, the processor 130 may perform a controlling operation corresponding to a user touch when the user touch is input on a specific area of the user interface window.

The processor 130 includes random access memory (RAM) 131, read only memory (ROM) 132, central processing unit (CPU) 133, graphics processing unit (GPU) 134, and bus 135. The RAM 131, the ROM 132, the CPU 133, and the GPU 134 may be connected with each other through the bus 135.

The CPU 133 accesses the storage 140 and performs booting using the operating system (O/S) stored in the storage 140. In addition, the CPU performs various operations using various programs, content, data, and the like, stored in the storage 140.

The ROM 132 may store a set of commands for the system booting. In response to a turn on command being input and power being supplied, the main CPU 133 copies an O/S stored in the storage 140 to the RAM 131, and executes the O/S to boot the system according to the command stored in the ROM 132. When booting is completed, the CPU 133 copies the various programs stored in the storage 140 to the RAM 131, and performs various operations by executing the copied programs in the RAM 131.

The GPU 134 displays a user interface (UI) on the touch screen when the booting of the user terminal apparatus 100 is completed. Specifically, the GPU 134 may generate a screen including various objects such as icons, images, and texts by using a calculator (not illustrated) and a renderer (not illustrated). The computation unit is configured to compute an attribute value, such as a coordinate value, to which each of the objects is to be displayed, a form, a size, a color, and the like, according to a layout of the screen. The renderer generates a screen having various layouts including the objects based on the attribute values calculated by the operator. The screen generated by the renderer (or a user interface window) is provided to the touch screen 120, and the touch screen 120 may display the screen.

GPS chip 150 is an element which receives GPS signals from a GPS satellite, and calculates current position of the user terminal apparatus 100. The processor 130 may calculate the user's position by using GPS chip 150 when the navigation program is used or when current position of a user is requested.

The video processor 160 is an element to process the contents received through the communicator 110 or the video data included in the contents stored in the storage 140. The video processor 160 may perform various image-processing regarding the video data, such as decoding, scaling, noise-filtering, frame rate converting, resolution conversion, and so on.

The audio processor 170 is an element to process the contents received through the communicator 110 or the audio data included in the contents stored in the storage 140. The audio processor 170 may perform various processing of the audio data such as decoding, amplifying, and noise filtering.

The processor 130 may drive the video processor 160 and the audio processor 170 to play back the corresponding content, when the play-back application regarding the multimedia content is implemented. In this case, the touch screen 120 may display the image frames generated in the video processor 160 on one or more of the main display area and the sub display areas.

The speaker 190 outputs the audio data generated in the audio processor 170.

The button 125 may be realized as various types of buttons such as a mechanical button, a touch pad, a wheel, etc. which are formed on a certain area such as the front, side, or rear of the exterior of the main body of the user terminal apparatus 100. The button 125 may include '+' button' and '−' button which are disposed on a side portion of an exterior of a main body to receive a command to increase volume or decrease volume, respectively.

The microphone 180 is an element to receive a user voice or other sounds and convert the same into audio data. The processor 130 may use the user voice inputted through the microphone 180 for a call process, or may convert the user voice into audio data and store it in the storage 140. The microphone 180 may be implemented as a stereo microphone which receives sound inputs from a plurality of locations.

The camera 185 is an element which captures still images or video images according to controlling of a user. The camera 185 may be implemented as plural units such as front surface camera and back surface camera. As described above, the camera 185 may be used as a means to obtain user images in the embodiment of tracking the gaze of a user.

When the camera 185 and the microphone 180 are provided, the processor 130 may perform controlling operations according to the user voice inputted through the microphone 180 or the user motion recognized by the camera 185. In other words, the user terminal apparatus 100 may operate in a motion controlling mode or a voice controlling mode. When operating in the motion controlling mode, the processor 130 photographs a user by activating the camera 185, tracks changes in the user's motion, and performs a corresponding operation. When operating in the voice control mode, the processor 130 may analyze the user voice inputted through the microphone 180, and perform controlling operation according to the analyzed user voice.

In the user terminal apparatus 100 supporting the motion controlling mode or the voice controlling mode, voice recognizing technologies or motion recognizing technologies may be used in the above various embodiments. For example, when a user performs a motion like selecting an object displayed on a home screen, or speaks a voice command corresponding to the object, it may be determined that the corresponding object is selected, and the controlling operation matched with the object may be performed.

Further, although not illustrated in FIG. 9, the user terminal apparatus 100 may also include a USB port that can be connected with a USB connector, various external inputting ports so as to connect various external components like a headset, a mouse, a LAN, and a digital multimedia broadcasting (DMB) chip to receive and process DMB signals, and various other sensors according to various embodiments.

Meanwhile, as described above, the storage 140 may store various programs.

Figure 10:
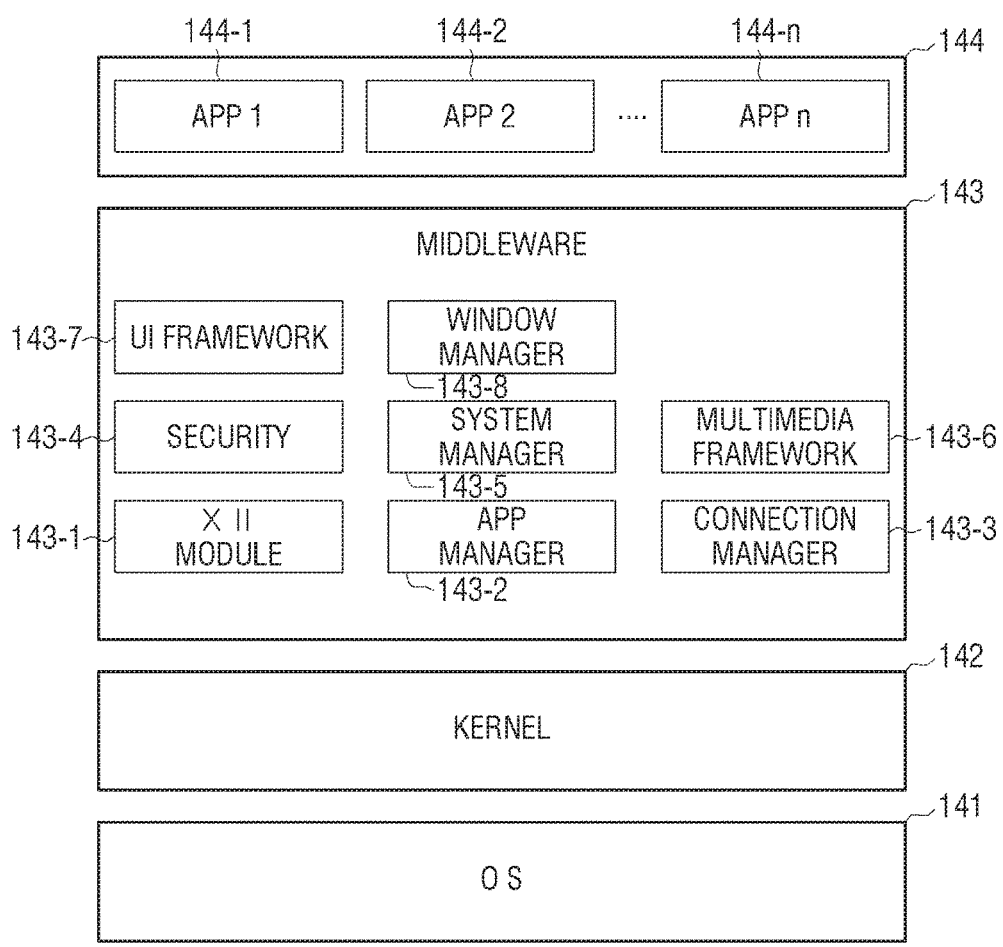
FIG. 10 illustrates an example of a software structure of a user terminal apparatus according to an embodiment of the present disclosure.

FIG. 10 illustrates an example of a software structure of the user terminal apparatus according to an embodiment of the present disclosure.

Referring to FIG. 10, the storage 140 may store the software including O/S 141, kernel 142, middleware 143, application 144, and so on.

The O/S 141 performs a function of controlling and managing overall operations of hardware. That is, the O/S 141 is a layer in charge of basic functions, such as hardware management, memory, security, and the like.

The kernel 142 serves as a pathway which delivers various signals including touch signals sensed in the touch screen 120 to the middleware 143.

The middleware 143 includes various software modules for controlling the operations of the user terminal apparatus 100. Specifically, the middleware 143 includes an X11 module 143-1, an APP manager 143-2, a connection manager 143-3, a security module 143-4, a system manager 143-5, a multimedia framework 143-6, a UI framework 143-7, a window manager 143-8, and so on.

The X11 module 143-1 is a module which receives various event signals from a variety of hardware provided in the user terminal apparatus 100. For example, various events may be set, such as the event of a user gesture being sensed, the event of the user terminal apparatus 100 moving in a specific direction, the event of a system alarm going off, the event of a specific program being executed or terminated, etc.

The APP manager 143-2 is a module to manage an execution state of various applications 440 installed in the storage 140. The APP manager 143-2 is configured to, when an application execution event is detected from the X11 module 143-1, call an application corresponding to the event and execute the application. For example, if a user selects an icon of a printer application, the APP manager 143-2 may call the printer application and execute the application.

The connection manager 143-3 is a module to support a wired or wireless network connection. The connection manager 143-3 may include various detailed modules. For example, a DNET module, a universal plug and play (UPnP) module, and the like may be included. Specifically, when the printer application is executed, the connection manager 143-3 may form a session with the image forming apparatus 200.

The security module 143-4 is a module to support a certification, permission, secure storage, and the like, with respect to hardware.

The system manager 143-5 monitors the states of the respective elements in the user terminal apparatus 100, and provides the result of the monitoring to the other modules. For example, when the battery is short, the error occurs, or the communication disconnects, the system manager 143-5 may provide the monitoring results to the main UI framework 143-7, and output a notice message or a notice sound.

The multimedia framework 143-6 is a module for reproducing multimedia contents which are stored in the user terminal apparatus 100 or provided from an external source. The multimedia framework 143-6 may include a player module, a camcorder module, a sound processing module, and the like. Accordingly, the multimedia framework 143-6 may generate a screen and sound corresponding to various multimedia contents and reproduce the same.

The UI framework 143-7 is a module to provide various UIs to be displayed on the touch screen 120. The UI framework 143-7 may include an image compositor module to configure various objects, a coordinates compositor to calculate coordinates for displaying an object, a rendering module to render the configured object on the calculated coordinates, and a two-dimensional (2D)/three-dimensional (3D) toolkit to provide a tool for configuring a UI in the form of 2D or 3D.

The window manager 143-8 may detect a touch event or other input events using a body of a user or using a pen. The window manager 143-8 is configured to, when such an event is detected, transmit an event signal to the main UI framework 143-7 and control an operation corresponding to the event to be performed.

Furthermore, various other program modules may be stored. For example, a writing module to draw lines according to dragging tracks when a user touches or drags the screen, and an angle calculating module to calculate pitch angle, roll angle, and yaw angle based on the values sensed by a gyro sensor of the user terminal apparatus 100 may be stored.

The application module 144 includes applications 144-1~144-*n* to support various functions. For example, application modules to provide various services, such as a printer application module, a navigation application module, a game module, an e-book module, a calendar module, an alarm management module, etc. may be included. Such applications may be installed as a default, and may as well be arbitrarily installed by a user in the usage process and used. The CPU 133 may, when an icon object in a user interface window is selected, execute an application corresponding to the selected icon object using the application module 144.

The software structure illustrated in FIG. 10 is merely an example of a software structure and it may not be limited thereto. Accordingly, some of the elements may as well be omitted, modified, or added as needed. For example, the storage 140 may additionally have various programs, such as a sensing module to analyze signals sensed by various sensors, a messaging module including a messenger program, an SMS and MMS program, and an e-mail program, a call info aggregator program module, a voice over IP (VoIP) module, a web browser module, or the like.

As described above, the user terminal apparatus 100 may be implemented as various types of apparatuses such as portable phone, tablet PC, laptop PC, PDA, MP3 player, e-album device, TV, PC, kiosk, etc. Thus, the configuration described in FIGS. 8 and 9 may be variously modified according to the type of the user terminal apparatus 100.

As described above, the user terminal apparatus may be embodied in various forms and configurations.

Figure 11:
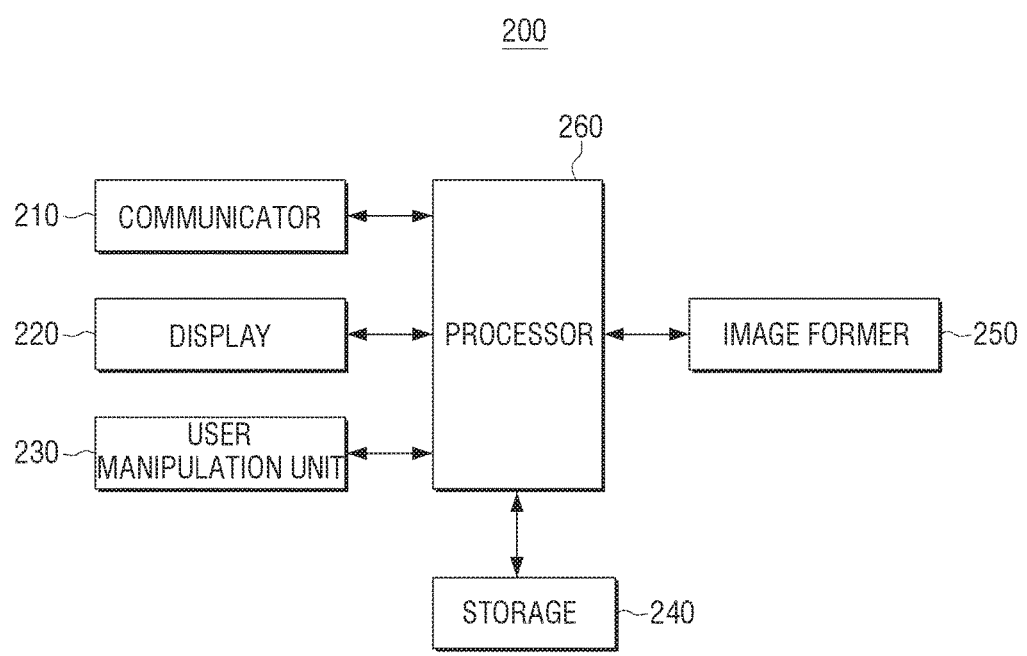
FIG. 11 is a block diagram illustrating configuration of an image forming apparatus of FIG. 1 according to an embodiment of the present disclosure.

FIG. 11 is a block diagram illustrating configuration of an image forming apparatus of FIG. 1 according to an embodiment of the present disclosure.

Referring to FIG. 11, the image forming apparatus 200 may be composed of a communicator 210, a display 220, a user manipulation unit 230, a storage 240, an image former 250, and a processor 260.

The communicator 210 may be formed to connect to an external apparatus and the connection may be performed through USB port and wireless module as well as LAN and internet network. In this case, the wireless module may be Wi-Fi, Wi-Fi Direct, NFC, Bluetooth, and the like.

The communicator 210 may receive a request for connection setting information from the user terminal apparatus 100 and transmit the connection setting information to the user terminal apparatus 100 in response to the request.

The communicator 210 may transmit a URL to the image forming apparatus 200. Specifically, if it is possible for the image forming apparatus 200 to generate a URL, the generated URL may be transmitted to the user terminal apparatus 100.

When receiving a connection request with respect to a URL, the communicator 210 may transmit a program corresponding to the received URL and connection setting information directly to the user terminal apparatus 100.

Subsequently, the communicator 210 may receive intrinsic information from the user terminal apparatus 100. The received intrinsic information may be stored in the storage 240 which will be described later.

The communicator 210 may receive printing data from the user terminal apparatus 100 or the cloud server 300. The printing data may be data of a printer language such as PS, PCL, etc. and if the image forming apparatus 200 supports direct printing, the printing data may be a file itself such as PDF, XPS, BMP, JPG etc.

The display 220 may display various information provided from the image forming apparatus 200. The display 220 may be a display such as a monitor. In actual implementation, it may be also implemented to be a touch screen which can perform functions of the user manipulation unit 230 (to be described) on one unit.

The display 220 displays a menu UI to receive selection of a function supported by an image forming apparatus. The display 220 displays pre-stored telephone numbers.

The display 220 may display a UI for receiving selection of a content to be transmitted.

Further, the display 220 may display that the user verification is necessary after the printing data is received. The display 220 may display a user interface window for performing the verification corresponding to the received user verification information. For example, the display 220 may display a screen to receive a password when the verification information is a password, or display guide information for NFC tag when the verification information is NFC information.

Further, the user manipulation unit 230 may include a plurality of function keys with which the user may set or select various functions supported by the image forming apparatus 200. The user manipulation unit 230 may be implemented to be device such as button, touch pad, mouse and keyboard, or may be implemented to be a touch screen that can also perform the functions of the display 220.

The user manipulation unit 230 may receive one of the displayed telephone numbers. In this case, the above-described URL may be transmitted to a user or a user terminal apparatus corresponding to the selected telephone number.

The storage 240 may store the printing data received through the communicator 210. Further, the storage 240 may store programs that control the functions of the image forming apparatus 200. In this case, the storage 240 may store a plurality of programs corresponding to several operating systems.

The storage 240 may store the received intrinsic information of an image forming apparatus. The storage 240 may store a plurality of telephone numbers.

Meanwhile, the storage 240 may be implemented to be a built-in storage medium of the image forming apparatus 200, or an external storage medium such as, for example, removable disk including USB memory, web server using network, and so on.

The image former 250 prints printing data on a printing paper. Specifically, the image former 250 may print the printing data received through the communicator 210 on a printing paper using at least one of an Ink-jet method, a dot-jet method and a laser printing method. In this case, the printing data may be data received through the communicator 210, scan data generated at a scanner, a fax data received at a fax machine.

The processor 260 controls each unit within the image forming apparatus 200. Specifically, when receiving a request to transmit connection setting information from the user terminal apparatus 100, the processor 260 may control the communicator 210 to transmit the connection setting information.

The processor 260 may generate a URL. Specifically, the processor 260 may generate a URL (for example, 'http://www.printersetup.com/setup') comprising of protocol, computer address of information resources, file directory and resources name. In this case, the processor 260 may generate a URL (for example, 'http://www.printersetup.com/setupMFP=M4080&SN=Z6YNB5E&MacAddr=00-00-00-E0 . . . ') such that the file directory and resources name of the URL include connection setting information. In addition, the processor 260 may generate a shortened URL form which implies and displays the above-described URL.

The communicator 210 may transmit the generated URL to the user terminal apparatus 100.

If a connection request regarding a URL is received from the user terminal apparatus 100, the processor 260 may identify the type of the user terminal apparatus which has transmitted the connection request, and control the communicator 210 to transmit a program corresponding to the identified type to the corresponding user terminal apparatus along with connection setting information.

When printing data is received from the user terminal apparatus 100, the image former 250 is controlled such that the received printing data can be printed.

The image forming apparatus 200 according to the above-described embodiment distributes a program to control the functions of the image forming apparatus and connection setting information which is necessary for connection with a specific image forming apparatus to another user terminal apparatus through a URL and thus, a user of the another user terminal apparatus may install the program and complete connection setting simply by accessing the corresponding URL.

In the above description regarding FIG. 11, the image forming apparatus 200 includes only the image former which prints a document, but the image forming apparatus 200 may further include a scanner which scans a manuscript, a fax machine capable of transmitting/receiving a fax.

Figure 12:
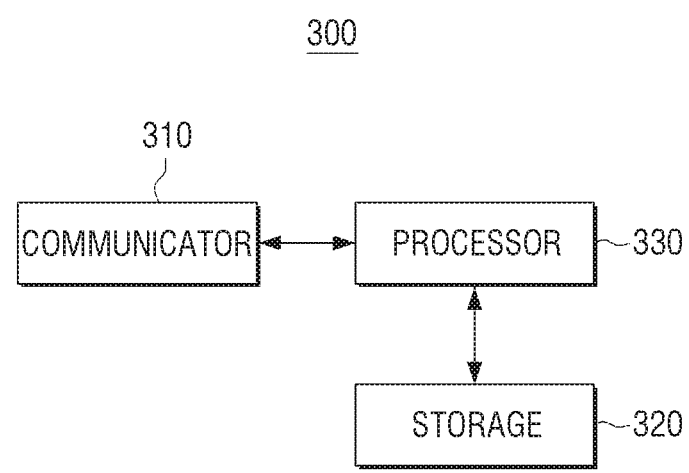
FIG. 12 is a block diagram illustrating configuration of a cloud server of FIG. 1 according to an embodiment of the present disclosure.

FIG. 12 is a block diagram illustrating configuration of a cloud server of FIG. 1 according to an embodiment of the present disclosure.

Referring to FIG. 12, the cloud server 300 may consist of a communicator 310, a storage 320 and a processor 330. In this case, the cloud server 300 may be another server separate from the image forming apparatus, or may be implemented to be a web server provided within the image forming apparatus 200.

The communicator 310 may be formed to connect to an external apparatus and the connection may be performed through USB port and wireless module as well as LAN and internet network. In this case, the wireless module may be Wi-Fi, Wi-Fi Direct, NFC, Bluetooth, and the like.

The communicator 310 may receive a request for connection setting information from the user terminal apparatus 100 and transmit the connection setting information to the user terminal apparatus 100 in response to the request.

When receiving a connection request with respect to a URL, the communicator 310 may transmit a program corresponding to the received URL and connection setting information directly to the user terminal apparatus 100.

If the above-described program is not stored in the cloud server 300, the communicator 310 may redirect program information and connection setting information to another server (for example, a web store server).

The communicator 310 may receive a document from the user terminal apparatus 100 and transmit printing data corresponding to the document to the image forming apparatus 200.

The storage 320 stores the received connection setting information.

Further, the storage 320 may store programs that control the functions of the image forming apparatus 200. In this case, the storage 320 may store a plurality of programs corresponding to several operating systems. In addition, the storage 320 may store a plurality of programs regarding each of various types of image forming apparatuses.

The storage 320 may store information corresponding to the generated URL (or web page, connection setting information, redirect information). The redirect information refers to address information of a separate server which may download the corresponding program if a program corresponding to the image forming apparatus is not stored in the cloud server 300.

The storage 320 may store a plurality of telephone numbers. The storage 320 may be implemented to be a built-in storage medium of the cloud server 300, or an external storage medium such as, for example, removable disk including USB memory, web server using network, and so on.

The processor 330 may control each unit within the cloud server 300. Specifically, when receiving the connection setting information, the processor 330 generates a URL. More specifically, the processor 330 may generate a URL (for example, 'http://www.printersetup.com/setup') comprising of protocol, computer address of information resources, file directory and resources name. In this case, the processor 330 may generate a URL (for example, 'http://www.printersetup.com/setupMFP=M4080&SN=Z6YNB5E&MacAddr=00-00-00-E0 . . . ') such that the file directory and resources name of the URL include connection setting information. In addition, the processor 330 may generate a shortened URL form which images and displays the above-described URL.

The processor 330 may control the communicator 310 to transmit the generated URL to the image forming apparatus 200.

If a connection request regarding a URL is received from the user terminal apparatus 100, the processor 330 may identify the type of the user terminal apparatus which has transmitted the connection request and control the communicator 310 to transmit a program corresponding to the identified type to the corresponding user terminal apparatus along with connection setting information. If the above-described program is not stored in the cloud server 300, the processor 330 may control the communicator 310 to redirect program information and connection setting information to another cloud server which provides a program corresponding to the URL.

When receiving a document from the user terminal apparatus 100, the processor 330 may control the communicator 310 to generate printing data regarding the received document and transmit the generated printing data to the image forming apparatus 200.

As such, the cloud server 300 according to the above-described embodiment distributes a program to control the functions of the image forming apparatus and connection setting information which is necessary for connection with a specific image forming apparatus to another user terminal apparatus through a URL and thus, a user of the another user terminal apparatus may install the program and complete connection setting simply by accessing the corresponding URL.

FIGS. 13, 14, 15, and 16 are views illustrating various examples of a user interface window which can be displayed on a user terminal apparatus of FIG. 1 according to various embodiments of the present disclosure.

Figure 13:
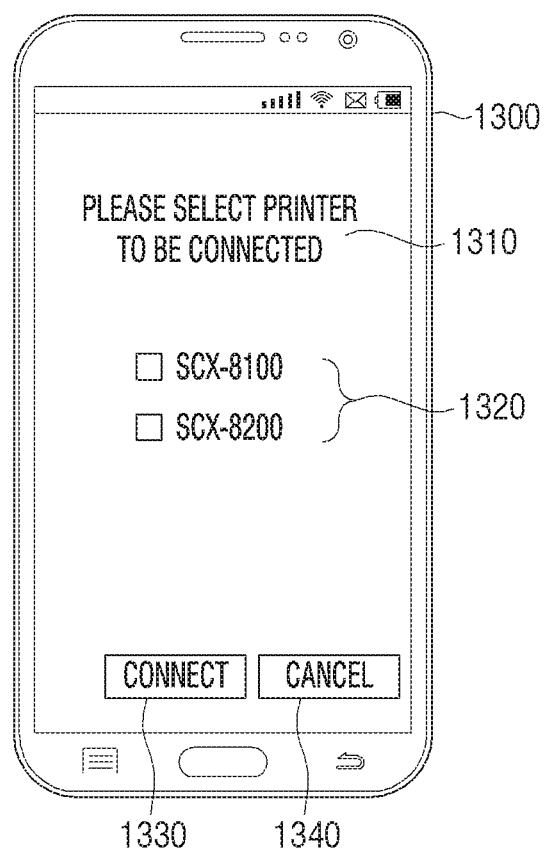
FIGS. 13, 14, 15, and 16 are views illustrating various examples of a user interface window which can be displayed on a user terminal apparatus of FIG. 1 according to various embodiments of the present disclosure.

Specifically, FIG. 13 is a view illustrating an example of a user interface window for receiving selection of an image forming apparatus to be connected.

Referring to FIG. 13, a user interface window 1300 includes an information display area 1310, a selection area 1320, a connection area 1330, and a cancellation area 1340.

The information display area 1310 is an area to display guide information to select an image forming apparatus to be connected.

The selection area 1320 is an area to display a list of connectable image forming apparatuses and receive a selection of at least one of the displayed image forming apparatuses.

The connection area 1330 is an area to receive a user command to proceed with connection setting with an image forming apparatus which is selected on the selection area 1320.

The cancellation area 1340 is an area to receive an input of a user command to terminate the process of connection setting.

Figure 14:
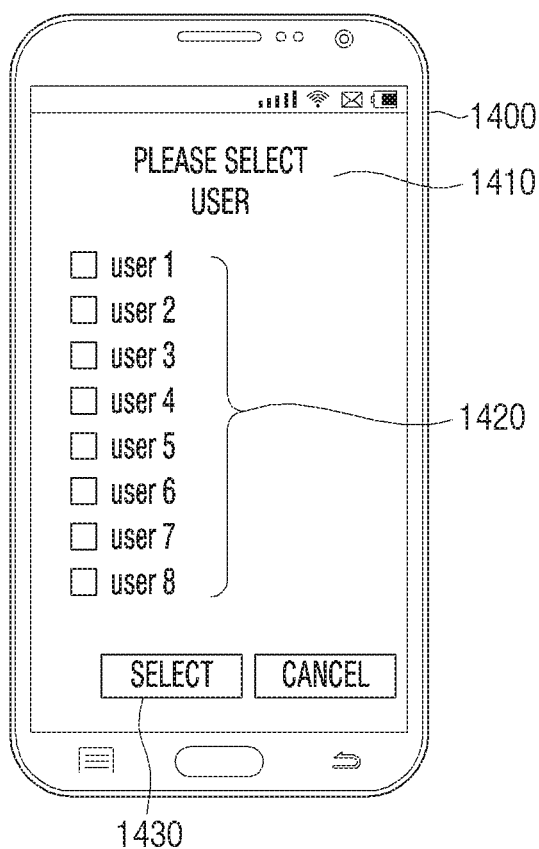

FIG. 14 is a view illustrating an example of a user interface window for receiving selection of another user terminal apparatus to receive notification of a URL according to an embodiment of the present disclosure.

Referring to FIG. 14, a user interface window 1400 includes an information display area 1410, a selection area 1420 and a completion area 1430.

The information display area 1410 is an area to display guide information to select another user terminal apparatus to receive a URL.

The selection area 1420 is an area to display a list of addresses stored in a user terminal apparatus and receive selection of at least one of the displayed addresses.

The connection area 1430 is an area to receive a command to transmit a URL to the selected address. For example, if the above-described address list is a SNS account list, and a user selects another user and selects the connection area 1430, a user interface window 1500 as illustrated in FIG. 15 may be displayed.

The cancellation area 1340 is an area to receive an input of a user command to terminate the process of connection setting.

Figure 15:
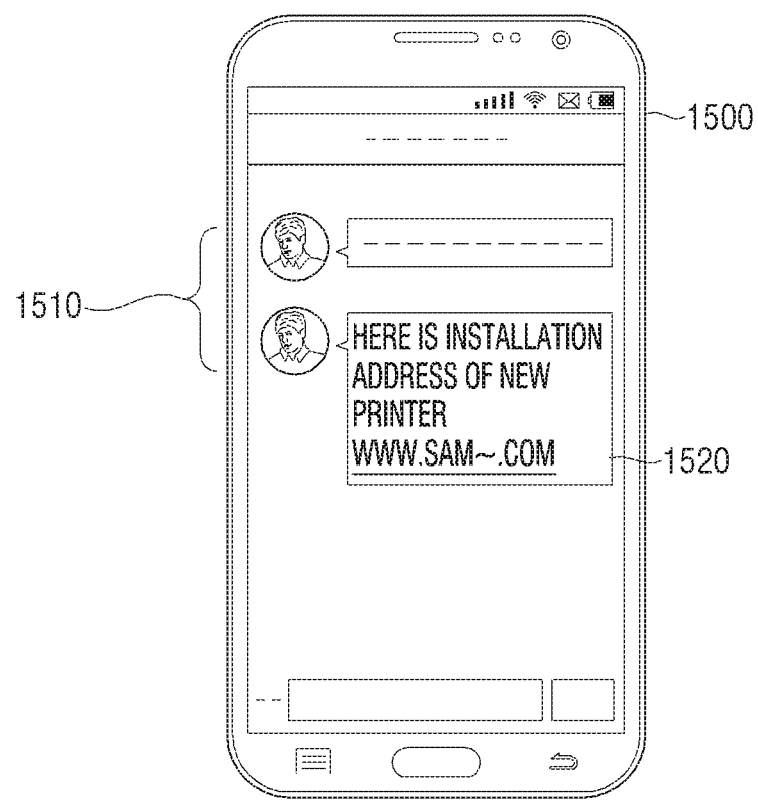

FIG. 15 is a view illustrating an example of an SNS message window according to an embodiment of the present disclosure.

Referring to FIG. 15, a user interface window 1500 is an SNS message window and includes a message display area 1510 to display a message of a conversation counterpart.

The message display area 1510 may include information 1520 regarding a URL.

Accordingly, the user terminal apparatus 100 of a counterpart which is not connected to the image forming apparatus 200 may easily install a program corresponding to the image forming apparatus 200 and complete connection setting simply by selecting the corresponding URL.

Figure 16:
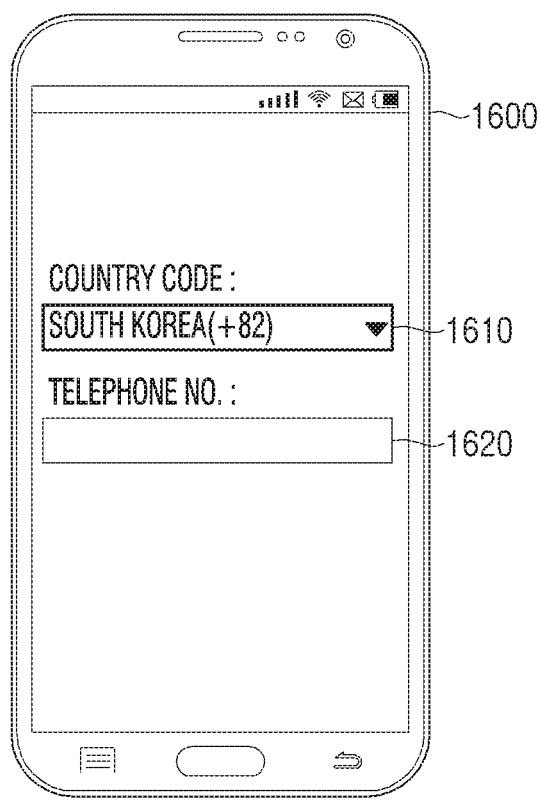

FIG. 16 is an example of a user interface window for receiving an input of intrinsic information in the process of using a connection setting method according to an embodiment of FIG. 7.

Referring to FIG. 16, a user interface window 1600 includes a country information area 1610 and a telephone number input area 1620.

The country information area 1610 is an area to receive selection of a user country.

The telephone number input area 1620 is an area to receive a telephone number from a user. In this embodiment, only a telephone number is illustrated as intrinsic information, but in actual implementation, MAC address of a terminal apparatus, a serial information, etc. can be input.

Figure 17:
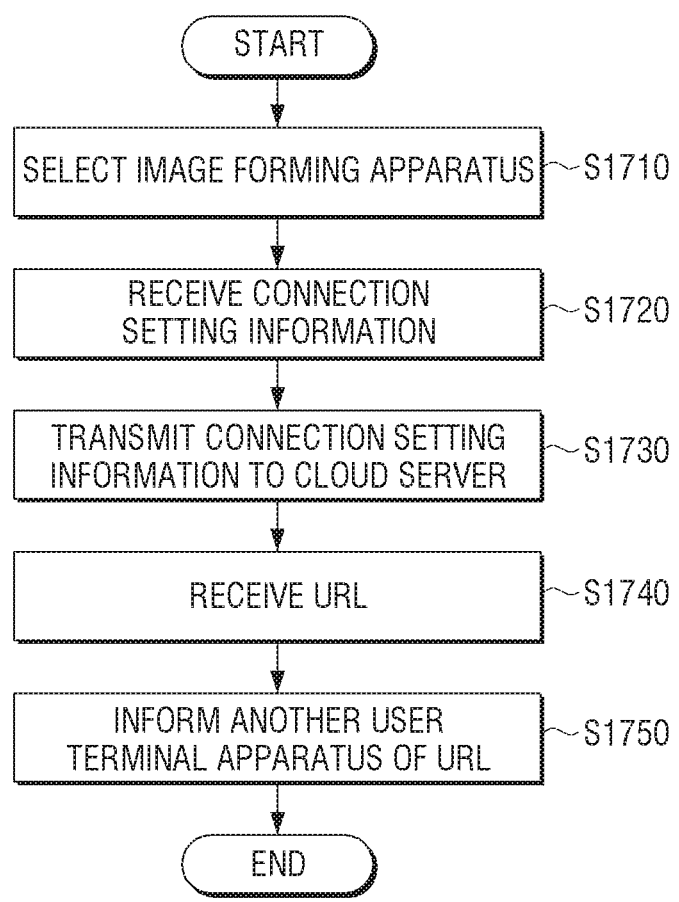
FIG. 17 is a flowchart provided to explain a connection setting method in a user terminal apparatus according to an embodiment of the present disclosure.

FIG. 17 is a flowchart provided to explain a connection setting method in a user terminal apparatus according to an embodiment of the present disclosure.

An image forming apparatus is selected at operation S1710. Specifically, when a program to control the functions of an image forming apparatus is installed, a list of connectable image forming apparatuses may be displayed and selection of an image forming apparatus to be connected from the displayed list may be received.

The connection setting information for connection with the selected image forming apparatus is received at operation S1720. In detail, the connection setting information may be requested to and received from the selected image forming apparatus. The connection setting information may consist of information which may specify the image forming apparatus (for example, model name, serial number, etc.) and information which may specify the location of the image forming apparatus (for example, IP address, MAC address, WPS-PIN information, etc.).

The received connection setting information is provided to a cloud server at operation S1730.

A URL corresponding to the image forming apparatus is received from the cloud server at operation S1740. The URL refers to an address where the type and location of specific information is recorded and may consist of protocol, computer address of information resource, file directory, and resource name.

Another user terminal apparatus is informed of the URL at operation S1750. In detail, the URL may be informed using at least one of SMS, MMS, SNS message, and e-mail. In this case, the URL may be informed to a plurality of user terminal apparatuses simultaneously.

As described above, a connection setting method of a user terminal apparatus according to an embodiment comprises distributing a program to control the functions of the image forming apparatus and connection setting information which is necessary for connection with a specific image forming apparatus to another user terminal apparatus through a URL and thus, a user of the another user terminal apparatus may install the program and complete connection setting simply by accessing the corresponding URL. The connection setting method of FIG. 17 may be executed in not only a user terminal apparatus having the configuration of FIG. 8 or FIG. 9 but also a user terminal apparatus having another configuration.

The above-described connection setting method of a user terminal apparatus may be implemented as a program (or an application) including an algorithm which can be executed in a computer, and the program may be stored in a non-transitory computer-readable medium and provided therein. For example, the above program may be implemented as an application and stored in a server such as an app store. A user of an electronic apparatus may download an application stored in a server and install the application in the electronic apparatus.

A non-transitory computer readable medium is not a medium that stores data for a short period, such as a register, a cache, or a memory, but means a medium which semi-permanently stores data and is readable by a device. Specifically, the above various applications or programs may be stored and provided in non-transitory computer readable recording medium such as CD, digital versatile disc (DVD), hard disk, Blu-ray disk, USB, memory card, ROM, etc.

Figure 18:
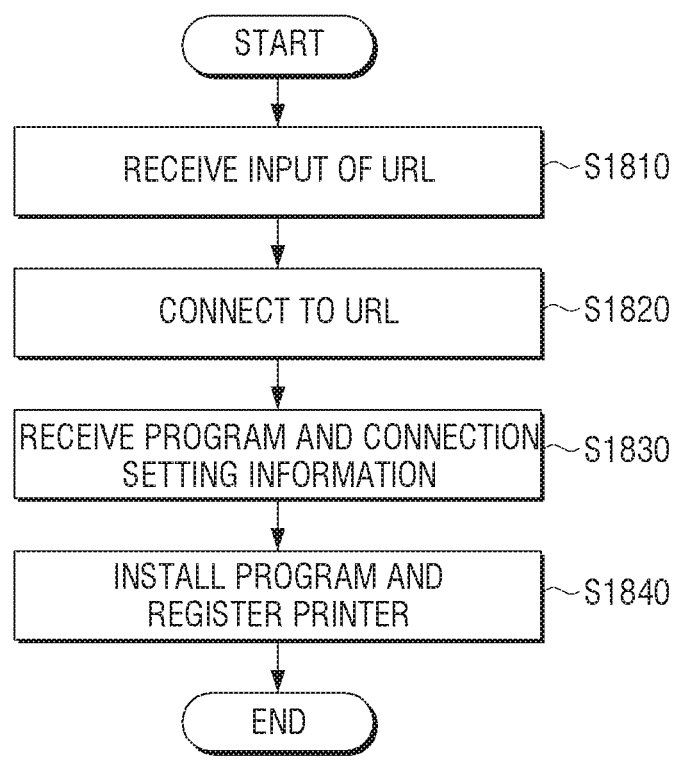
FIG. 18 is a flowchart provided to explain a connection setting method in a user terminal apparatus according to an embodiment of the present disclosure.

FIG. 18 is a flowchart provided to explain a connection setting method in a user terminal apparatus according to an embodiment of the present disclosure.

A URL is input at operation S1810. In detail, a URL may be received from another user terminal apparatus or the location of a URL may be input directly from a user.

The URL is connected at operation S1820. In detail, if a message including the location of a URL is received from another user terminal apparatus, a link in the corresponding message may be selected to be connected to the URL.

A program to control the functions of an image forming apparatus which is mapped to the URL and connection setting information for connection with the image forming apparatus are received at operation S1830. In this case, the program to control the functions of the image forming apparatus may be printer driver, scan driver, application for mobile device, etc. The above-described program and connection setting information may be received from a cloud server which provides the above-described URL or received from another separate download server or a web store server.

The received program is installed in the user terminal apparatus, and connection with the image forming apparatus is set using the received connection setting information at operation S1840.

When the installation of the program and connection setting are completed, a document to be printed may be received from a user, and the selected document itself or printing data which is converted from the document may be transmitted to the image forming apparatus to perform the printing job.

The connection setting method in a user terminal apparatus according to the above-described embodiment may be performed simply by connecting a program to control the functions of an image forming apparatus and connection setting information which is necessary for connection with the specific image forming apparatus to a URL. The connection setting method of FIG. 18 may be executed in not only a user terminal apparatus having the configuration of FIG. 8 or FIG. 9 but also a user terminal apparatus having another configuration.

The above-described connection setting method of a user terminal apparatus may be implemented as a program (or an application) including an algorithm which can be executed in a computer, and the program may be stored in a non-transitory computer-readable medium and provided therein. For example, the above program may be implemented as an application and stored in a server such as an app store. A user of an electronic apparatus may download an application stored in a server and install the application in the electronic apparatus.

Figure 19:
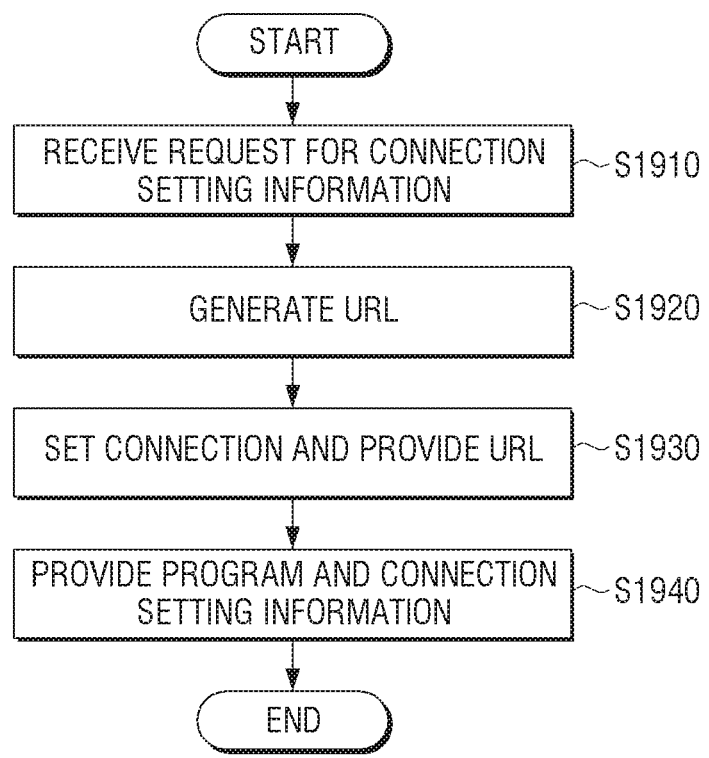
FIG. 19 is a flowchart provided to explain a connection setting method in an image forming apparatus according to an embodiment of the present disclosure.

FIG. 19 is a flowchart provided to explain a connection setting method in an image forming apparatus according to an embodiment of the present disclosure.

A request for connection setting information is received from a user terminal apparatus at operation S1910.

A URL for providing a program to control the functions of an image forming apparatus and connection setting information for connection with the image forming apparatus is generated at operation S1920. Specifically, a URL (for example, 'http://www.printersetup.com/setup') comprising of protocol, computer address of information resources, file directory and resources name may be generated. In this case, a URL (for example, 'http://www.printersetup.com/setupMFP=M4080&SN=Z6YNB5E&MacAddr=00-00-00-E0 . . . ') may be generated such that the file directory and resources name of the URL include connection setting information. In addition, the above-described URL may be generated in a shortened URL form which implies and displays the above-described URL.

The generated URL and connection setting information are provided to the user terminal apparatus at operation S1930.

Subsequently, when an access request regarding the URL is received from another user terminal apparatus, a program to control the functions of the image forming apparatus and connection setting information may be transmitted to the another user terminal apparatus which has transmitted the access request at operation S1940. In this case, the image forming apparatus may identify the type of the user terminal apparatus which has transmitted the access request and transmit a program corresponding to the identified type.

The connection setting method of a user terminal apparatus according to an embodiment distributes a program to control the functions of the image forming apparatus and connection setting information which is necessary for connection with a specific image forming apparatus to another user terminal apparatus through a URL and thus, a user of the another user terminal apparatus may install the program and complete connection setting simply by accessing the corresponding URL. The connection setting method of FIG. 19 may be executed in not only a user terminal apparatus having the configuration of FIG. 11 but also a user terminal apparatus having another configuration.

The above-described connection setting method of an image forming apparatus may be implemented as a program (or an application) including an algorithm which can be executed in a computer, and the program may be stored in a non-transitory computer-readable medium and provided therein. For example, the above program may be implemented as an application and stored in a server such as an app store. A user of an electronic apparatus may download an application stored in a server and install the application in the electronic apparatus.

Figure 20:
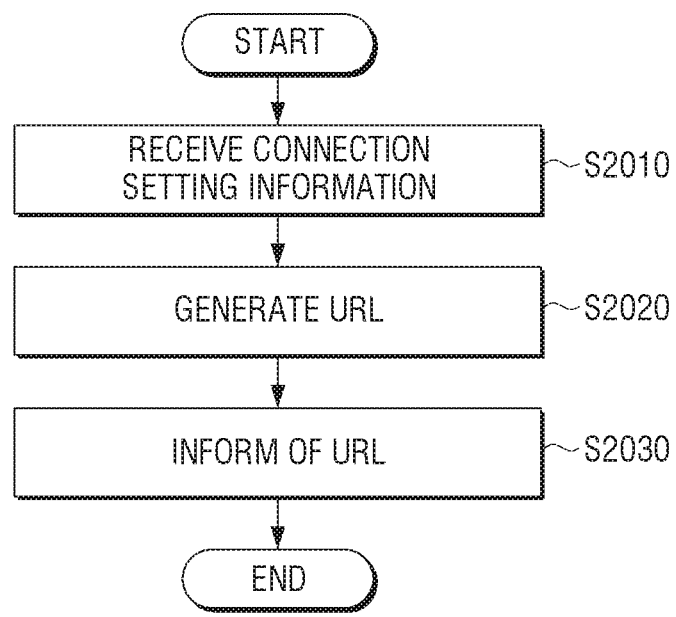
FIG. 20 is a flowchart provided to explain a connection setting method in a cloud server according to an embodiment of the present disclosure.

FIG. 20 is a flowchart provided to explain a connection setting method in a cloud server according to an embodiment of the present disclosure.

Referring to FIG. 20, the connection setting information is received from a user terminal apparatus at operation S2010.

A URL for providing a program to control the functions of an image forming apparatus and connection setting information for connection with the image forming apparatus is generated based on the received connection setting information at operation S2020. Specifically, a URL (for example, 'http://www.printersetup.com/setup') consisting of protocol, computer address of information resources, file directory and resources name may be generated. In this case, a URL (for example, 'http://www.printersetup.com/setupMFP=M4080& SN=Z6YNB5E&MacAddr=00-00-00-E0 . . . ') may be generated such that the file directory and resources name of the URL include connection setting information. In addition, the above-described URL may be generated in a shortened URL form which implies and displays the above-described URL.

The generated URL and connection setting information are provided to the user terminal apparatus at operation S2030.

When an access request regarding the URL is received from another user terminal apparatus, a program to control the functions of the image forming apparatus and connection setting information may be transmitted to the another user terminal apparatus which has transmitted the access request.

The connection setting method of a cloud server according to an embodiment distributes a program to control the functions of the image forming apparatus and connection setting information which is necessary for connection with a specific image forming apparatus to another user terminal apparatus through a URL and thus, a user of the another user terminal apparatus may install the program and complete connection setting simply by accessing the corresponding URL. The connection setting method of FIG. 20 may be executed in not only a cloud server having the configuration of FIG. 12 but also a cloud server having another configuration.

The above-described connection setting method of a cloud server may be implemented as a program (or an application) including an algorithm which can be executed in a computer, and the program may be stored in a non-transitory computer-readable medium and provided therein. For example, the above program may be implemented as an application and stored in a server such as an app store. A user of an electronic apparatus may download an application stored in a server and install the application in the electronic apparatus.

The connection setting information may include apparatus information and address information of the image forming apparatus, and the address information may be at least one of an internet protocol (IP) address, a media access control (MAC) address, a Wi-Fi protected setup-personal identification number (WPS-PIN) address or a telephone number of the image forming apparatus.

The apparatus may further include a memory configured to, in response to receiving intrinsic information of a first user terminal apparatus from a second user terminal apparatus, store the received intrinsic information of the first user terminal apparatus, and the at least one processor, in response to receiving a request for connection setting information including the intrinsic information from the first user terminal apparatus, may transmit the connection setting information to the first user terminal apparatus.

The cloud server may further include a storage configured to store a plurality of programs corresponding to a type of an image forming apparatus, and the at least one processor, in response to receiving a connection request regarding the URL from another user terminal apparatus, may control the transceiver to transmit a program corresponding to the URL to the another user terminal apparatus.

Each of the plurality of programs may be one of printer driver, scan driver and application for mobile device.

The at least one processor may identify a type of the another user terminal apparatus that transmitted the connection request, and control the transceiver to transmit a program corresponding to the identified another user terminal apparatus to the another user terminal apparatus.

The at least one processor, in response to receiving a connection request regarding the URL from another user terminal apparatus, may redirect information of the program and the connection setting information to another cloud server which provides a program corresponding to the URL.

The user terminal apparatus may inform the URL using at least one of a short message service (SMS), a multimedia message service (MMS), a social networking service (SNS) message or an e-mail service.

The another user terminal apparatus may connect to the URL to receive a program to control functions of an image forming apparatus mapped to the URL and connection setting information for connecting the image forming apparatus, install the received program on the another user terminal apparatus and set connection with the image forming apparatus using the received connection setting information.

The program to control functions of the image forming apparatus may be one of printer driver, scan driver and application for mobile device.

The connection setting information may include apparatus information and address information of the image forming apparatus, and the address information may be at least one of an IP address, a MAC address, a WPS-PIN address or a telephone number of the image forming apparatus.

The method may further include receiving intrinsic information of a first user terminal apparatus from a second user terminal apparatus and storing the received intrinsic information of the first user terminal apparatus, and the receiving a request may include receiving a request for connection setting information including the intrinsic information from the first user terminal apparatus, and the transmitting may include transmitting the connection setting information to the first user terminal apparatus.

The method may further include, in response to receiving a connection request regarding the URL from another user terminal apparatus, transmitting a program corresponding to the URL to the another user terminal apparatus.

The informing may include informing the URL using at least one of SMS, MMS, SNS message and e-mail.

The program to control functions of the image forming apparatus may be one of printer driver, scan driver and application for mobile device.

What is claimed is:

1. An image forming apparatus comprising:
a communicator;
an image former;
a memory to, in response to receiving identification information of a second user terminal apparatus from a first user terminal apparatus, store the received identification information of the second user terminal apparatus; and
at least one processor to:
receive a first request for connection setting information about the image forming apparatus from the first user terminal apparatus,
in response to the first request, control the communicator to transmit the connection setting information about the image forming apparatus to the first user terminal apparatus,
receive a second request for the connection setting information about the image forming apparatus from the second user terminal apparatus, the second request including the identification information of the second user terminal apparatus,
in response to the second request, control the communicator to transmit the connection setting information to the second user terminal apparatus, and
establish a communication connection with the second user terminal apparatus using the connection setting information.

2. The apparatus of claim 1,
wherein the connection setting information about the image forming apparatus includes apparatus information and address information of the image forming apparatus, and
wherein the address information includes at least one of an internet protocol (IP) address, a media access control (MAC) address, a Wi-Fi protected setup-personal identification number (WPS-PIN) address, or a telephone number of the image forming apparatus.

3. The apparatus of claim 1,
wherein the identification information of the second user terminal apparatus includes at least one of a telephone number, a media access control (MAC) address, serial number information, a social network service identification, or a messenger identification of the second user terminal apparatus.

4. A connection setting method of an image forming apparatus, the method comprising:
receiving a first request for connection setting information about the image forming apparatus from a first user terminal apparatus;
transmitting the connection setting information to the first user terminal apparatus;
receiving identification information of a second user terminal apparatus from the first user terminal apparatus;
storing the received identification information of the second user terminal apparatus;
receiving a second request for the connection setting information about the image forming apparatus from the second user terminal apparatus, the second request including the identification information of the second user terminal apparatus;
transmitting the connection setting information to the second user terminal apparatus; and
establishing a communication connection with the second user terminal apparatus using the connection setting information.

5. The method of claim 4,
wherein the connection setting information about the image forming apparatus includes apparatus information and address information of the image forming apparatus, and
wherein the address information includes at least one of an internet protocol (IP) address, a media access control (MAC) address, a Wi-Fi protected setup-personal identification number (WPS-PIN) address, or a telephone number of the image forming apparatus.

6. The method of claim 4,
wherein the identification information of the second user terminal apparatus includes at least one of a telephone number, a media access control (MAC) address, serial number information, a social network service identification, or a messenger identification of the second user terminal apparatus.

* * * * *